(12) United States Patent
Norair

(10) Patent No.: US 9,357,425 B2
(45) Date of Patent: *May 31, 2016

(54) METHOD AND APPARATUS FOR ADAPTIVE SEARCHING OF DISTRIBUTED DATASETS

(71) Applicant: Blackbird Technology Holdings, Inc., Dover, DE (US)

(72) Inventor: John Peter Norair, San Francisco, CA (US)

(73) Assignee: Blackbird Technology Holdings, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,689

(22) Filed: Mar. 9, 2015

(65) Prior Publication Data

US 2015/0271695 A1 Sep. 24, 2015

Related U.S. Application Data

(63) Continuation of application No. 13/267,640, filed on Oct. 6, 2011, now Pat. No. 8,976,691.

(60) Provisional application No. 61/404,513, filed on Oct. 6, 2010.

(51) Int. Cl.
*H04B 17/00* (2015.01)
*H04W 24/10* (2009.01)
*H04W 76/02* (2009.01)

(52) U.S. Cl.
CPC ............ *H04W 24/10* (2013.01); *H04W 76/023* (2013.01)

(58) Field of Classification Search
CPC .................................................. H04W 76/023
See application file for complete search history.

(56) References Cited

U.S. PATENT DOCUMENTS

| 5,338,625 A | 8/1994 | Bates |
| 5,615,366 A | 3/1997 | Hansen |

(Continued)

FOREIGN PATENT DOCUMENTS

| EP | 1321009 B1 | 1/2007 |
| JP | 2009/010449 A | 1/2009 |
| WO | 2006001556 A1 | 1/2006 |
| WO | 2009023592 A2 | 2/2009 |

OTHER PUBLICATIONS

PCT International Searching Authority, Notification Concerning Transmittal of the International Search Report and the Written Opinion of the International Searching Authority, or the Declaration, in International application No. PCT/US2011/55118, dated Feb. 28, 2012. (25 pages).

(Continued)

*Primary Examiner* — Brian O'Connor
(74) *Attorney, Agent, or Firm* — McAndrews, Held & Malloy, Ltd.

(57) ABSTRACT

A first communication device comprising memory in which data is stored may receive a request packet from a second communication device, measure received signal strength for the request packet, and determine whether to perform the requested search of the data stored in the memory based on the received signal strength and the power at which the request packet was transmitted. The search request packet may comprise a request to search the data stored in the memory, and a transmit power field that indicates a power at which the request packet was transmitted. The determining may be based on a result of a comparison between the received signal strength and a threshold and/or based on a comparison of a relative power and a threshold. The relative power may be calculated utilizing the received signal strength and the power at which the packet was transmitted.

17 Claims, 18 Drawing Sheets

(56) References Cited

U.S. PATENT DOCUMENTS

| | | |
|---|---|---|
| 5,729,557 A | 3/1998 | Gardner et al. |
| 5,959,281 A | 9/1999 | Domiteaux |
| 6,115,379 A | 9/2000 | Flanders et al. |
| 6,307,846 B1 | 10/2001 | Willey |
| 6,330,700 B1 | 12/2001 | Morris |
| 6,356,442 B1 | 3/2002 | Lunsford |
| 6,381,243 B1 | 4/2002 | Ekstedt |
| 6,388,997 B1 | 5/2002 | Scott |
| 6,424,301 B1 | 7/2002 | Johnson |
| 6,452,569 B1 | 9/2002 | Park |
| 6,525,928 B1 | 2/2003 | Madsen |
| 6,549,959 B1 | 4/2003 | Yates |
| 6,665,308 B1 | 12/2003 | Rakib |
| 6,700,491 B2 | 3/2004 | Shafer |
| 6,705,531 B1 | 3/2004 | Norton |
| 6,714,559 B1 | 3/2004 | Meier |
| 6,771,985 B1 | 8/2004 | Iinuma |
| 7,009,941 B1 | 3/2006 | Uchino |
| 7,072,431 B2 | 7/2006 | Wang |
| 7,233,603 B2 | 6/2007 | Lee |
| 7,280,555 B2 | 10/2007 | Stanforth |
| 7,292,548 B2 | 11/2007 | Lim |
| 7,293,088 B2 * | 11/2007 | Douglas ............... G01S 5/0252 455/404.2 |
| 7,305,237 B2 | 12/2007 | Stephens |
| 7,308,103 B2 | 12/2007 | Corcoran et al. |
| 7,315,248 B2 | 1/2008 | Egbert |
| 7,330,446 B2 | 2/2008 | Lee |
| 7,369,512 B1 | 5/2008 | Shurbanov et al. |
| 7,554,981 B2 | 6/2009 | Kecskemeti |
| 7,580,397 B2 | 8/2009 | Arai |
| 7,606,256 B2 | 10/2009 | Vitebsky |
| 7,643,509 B2 | 1/2010 | Han |
| 7,663,878 B2 | 2/2010 | Swan |
| 7,672,284 B2 | 3/2010 | Sugar et al. |
| 7,689,195 B2 | 3/2010 | Wu |
| 7,698,463 B2 | 4/2010 | Ogier et al. |
| 7,735,116 B1 | 6/2010 | Gauvin |
| 7,760,689 B2 | 7/2010 | Shin |
| 7,805,129 B1 | 9/2010 | Issa |
| 7,814,107 B1 | 10/2010 | Thirumalai |
| 7,890,839 B2 | 2/2011 | Iwami |
| 7,941,197 B2 | 5/2011 | Jain |
| 7,962,361 B2 | 6/2011 | Ramchandani |
| 8,035,488 B2 | 10/2011 | Shiotsu |
| 8,036,715 B2 | 10/2011 | Buck |
| 8,325,665 B2 | 12/2012 | Kim |
| 8,351,409 B2 | 1/2013 | Albert |
| 8,483,196 B2 | 7/2013 | Wang |
| 8,554,271 B2 | 10/2013 | Wang |
| 8,599,687 B1 | 12/2013 | Kleyman |
| 8,718,551 B2 | 5/2014 | Norair |
| 8,774,096 B2 | 7/2014 | Norair |
| 8,867,370 B2 | 10/2014 | Norair |
| 8,885,586 B2 * | 11/2014 | Norair ................... H04L 1/0061 370/328 |
| 8,909,865 B2 | 12/2014 | Norair |
| 8,929,961 B2 | 1/2015 | Norair |
| 8,976,691 B2 * | 3/2015 | Norair ................. H04W 76/023 370/252 |
| 9,042,353 B2 | 5/2015 | Norair |
| 2002/0022495 A1 | 2/2002 | Choi |
| 2002/0025823 A1 | 2/2002 | Hara |
| 2002/0078045 A1 | 6/2002 | Dutta |
| 2002/0108045 A1 | 8/2002 | Wells |
| 2003/0115369 A1 | 6/2003 | Walter |
| 2003/0128674 A1 | 7/2003 | Kong |
| 2003/0154243 A1 | 8/2003 | Crockett |
| 2003/0183691 A1 | 10/2003 | Lahteenmaki |
| 2004/0157631 A1 | 8/2004 | Stobart |
| 2004/0218557 A1 | 11/2004 | Kim et al. |
| 2005/0078038 A1 | 4/2005 | Takaki |
| 2005/0083943 A1 | 4/2005 | Lee et al. |
| 2005/0128086 A1 | 6/2005 | Brown |
| 2005/0135291 A1 | 6/2005 | Ketchum et al. |
| 2005/0138178 A1 * | 6/2005 | Astarabadi ........ H04W 36/0083 709/227 |
| 2005/0139685 A1 | 6/2005 | Kozlay |
| 2005/0174953 A1 | 8/2005 | Ho |
| 2005/0177633 A1 | 8/2005 | Plunkett |
| 2006/0002312 A1 | 1/2006 | Delattre et al. |
| 2006/0061795 A1 | 3/2006 | Walmsley |
| 2006/0088021 A1 | 4/2006 | Nelson et al. |
| 2006/0091223 A1 | 5/2006 | Zellner |
| 2006/0145817 A1 | 7/2006 | Aikawa |
| 2006/0165024 A1 | 7/2006 | Iwami |
| 2006/0175420 A1 | 8/2006 | Satou |
| 2006/0184860 A1 | 8/2006 | Takagi |
| 2006/0205343 A1 | 9/2006 | Runyon |
| 2006/0219776 A1 | 10/2006 | Finn |
| 2006/0220867 A1 | 10/2006 | Dixon |
| 2007/0000316 A1 | 1/2007 | Lauer |
| 2007/0002892 A1 | 1/2007 | Waxman |
| 2007/0010928 A1 | 1/2007 | Brusarosco |
| 2007/0026891 A1 | 2/2007 | Lai |
| 2007/0058661 A1 | 3/2007 | Chow |
| 2007/0083697 A1 | 4/2007 | Birrell |
| 2007/0083924 A1 | 4/2007 | Lu |
| 2007/0099641 A1 | 5/2007 | Lastinger |
| 2007/0113636 A1 | 5/2007 | Huang |
| 2007/0125836 A1 | 6/2007 | McAllister et al. |
| 2007/0136509 A1 | 6/2007 | Agami |
| 2007/0183366 A1 | 8/2007 | Park |
| 2007/0211532 A1 | 9/2007 | Gonzalez |
| 2007/0232281 A1 | 10/2007 | Nakai |
| 2007/0254619 A1 | 11/2007 | Salomone |
| 2007/0295074 A1 | 12/2007 | Kobayakawa |
| 2008/0041936 A1 | 2/2008 | Vawter |
| 2008/0069097 A1 | 3/2008 | Motegi |
| 2008/0075123 A1 | 3/2008 | Fourcand |
| 2008/0107060 A1 | 5/2008 | Andou et al. |
| 2008/0121687 A1 | 5/2008 | Buhot |
| 2008/0123683 A1 | 5/2008 | Cheng |
| 2008/0130597 A1 | 6/2008 | Kalhan |
| 2008/0164325 A1 | 7/2008 | Borracci |
| 2008/0172357 A1 | 7/2008 | Rechis |
| 2008/0186857 A1 | 8/2008 | Becker |
| 2008/0186867 A1 | 8/2008 | Schoo et al. |
| 2008/0209322 A1 | 8/2008 | Kaufman |
| 2008/0219323 A1 | 9/2008 | Desai |
| 2008/0228592 A1 | 9/2008 | Kotas |
| 2008/0238621 A1 | 10/2008 | Rofougaran |
| 2008/0242279 A1 | 10/2008 | Ramer |
| 2008/0256409 A1 | 10/2008 | Oran et al. |
| 2008/0279210 A1 | 11/2008 | Naka |
| 2008/0302177 A1 | 12/2008 | Sinnett |
| 2008/0320139 A1 | 12/2008 | Fukuda |
| 2009/0003376 A1 | 1/2009 | Horvat |
| 2009/0006376 A1 | 1/2009 | Hendriks |
| 2009/0034491 A1 | 2/2009 | Adams |
| 2009/0055377 A1 | 2/2009 | Hedge |
| 2009/0069049 A1 | 3/2009 | Jain |
| 2009/0073070 A1 | 3/2009 | Rofougaran |
| 2009/0094501 A1 | 4/2009 | Jijina |
| 2009/0113267 A1 | 4/2009 | Harrison |
| 2009/0138948 A1 | 5/2009 | Calamera |
| 2009/0141531 A1 | 6/2009 | Abedin |
| 2009/0150646 A1 | 6/2009 | Allen |
| 2009/0171749 A1 | 7/2009 | Laruelle |
| 2009/0171947 A1 | 7/2009 | Karayel |
| 2009/0196279 A1 | 8/2009 | Kim |
| 2009/0210898 A1 | 8/2009 | Childress et al. |
| 2009/0251295 A1 | 10/2009 | Norair |
| 2009/0268674 A1 | 10/2009 | Liu |
| 2009/0279652 A1 | 11/2009 | Sinha |
| 2009/0286496 A1 | 11/2009 | Yavuz et al. |
| 2009/0292418 A1 | 11/2009 | Kuykendal |
| 2010/0011156 A1 | 1/2010 | Yim |
| 2010/0026589 A1 | 2/2010 | Dou |
| 2010/0027558 A1 | 2/2010 | Han |
| 2010/0036806 A1 | 2/2010 | Lam |
| 2010/0052859 A1 | 3/2010 | Lossau |
| 2010/0075612 A1 * | 3/2010 | Oi ....................... H04B 17/327 455/67.13 |

(56) References Cited

U.S. PATENT DOCUMENTS

| | | |
|---|---|---|
| 2010/0078471 A1 | 4/2010 | Lin |
| 2010/0082893 A1 | 4/2010 | Ma |
| 2010/0097946 A1 | 4/2010 | Celentano |
| 2010/0097956 A1 | 4/2010 | Tauil |
| 2010/0097957 A1 | 4/2010 | Pirzada et al. |
| 2010/0118737 A1 | 5/2010 | Kim |
| 2010/0162069 A1 | 6/2010 | Niu |
| 2010/0177696 A1 | 7/2010 | Jung |
| 2010/0179877 A1 | 7/2010 | Lam |
| 2010/0181377 A1 | 7/2010 | Chen |
| 2010/0190437 A1 | 7/2010 | Buhot |
| 2010/0197261 A1 | 8/2010 | Zibrik et al. |
| 2010/0228617 A1 | 9/2010 | Ransom et al. |
| 2010/0232408 A1 | 9/2010 | Lim |
| 2010/0256976 A1 | 10/2010 | Atsmon |
| 2010/0261496 A1 | 10/2010 | Fukumoto |
| 2010/0280904 A1 | 11/2010 | Ahuja |
| 2010/0295681 A1 | 11/2010 | Burns et al. |
| 2010/0303051 A1 | 12/2010 | Umeuchi |
| 2010/0313241 A1 | 12/2010 | Lee |
| 2010/0329131 A1 | 12/2010 | Oyman |
| 2011/0003607 A1 | 1/2011 | Forenza et al. |
| 2011/0007733 A1 | 1/2011 | Kubler et al. |
| 2011/0029370 A1 | 2/2011 | Roeding |
| 2011/0064013 A1 | 3/2011 | Liu |
| 2011/0074552 A1 | 3/2011 | Norair |
| 2011/0099037 A1 | 4/2011 | Levin |
| 2011/0111766 A1 | 5/2011 | Yang |
| 2011/0112892 A1 | 5/2011 | Tarantino |
| 2011/0116513 A1 | 5/2011 | Gilson |
| 2011/0156872 A1 | 6/2011 | Wengrovitz |
| 2011/0191657 A1 | 8/2011 | Bliss |
| 2011/0223937 A1 | 9/2011 | Leppanen |
| 2011/0268024 A1 | 11/2011 | Jamp |
| 2011/0306384 A1 | 12/2011 | Wei |
| 2011/0316716 A1 | 12/2011 | Mackay |
| 2012/0001730 A1 | 1/2012 | Potyrailo |
| 2012/0039265 A1 | 2/2012 | Patel |
| 2012/0059936 A1 | 3/2012 | Bauchot |
| 2012/0086615 A1 | 4/2012 | Norair |
| 2012/0087267 A1 | 4/2012 | Norair |
| 2012/0087350 A1 | 4/2012 | Norair |
| 2012/0088449 A1 | 4/2012 | Norair |
| 2012/0093151 A1 | 4/2012 | McFarland |
| 2012/0116694 A1 | 5/2012 | Norair |
| 2012/0116887 A1 | 5/2012 | Norair |
| 2012/0118952 A1 | 5/2012 | Norair |
| 2012/0136704 A1 | 5/2012 | Carlson |
| 2012/0191848 A1 | 7/2012 | Norair |
| 2012/0191901 A1 | 7/2012 | Norair |
| 2012/0201246 A1 | 8/2012 | Fernandez |
| 2012/0207141 A1 | 8/2012 | Norair |
| 2012/0209716 A1 | 8/2012 | Burns |
| 2012/0224491 A1 | 9/2012 | Norair |
| 2012/0224530 A1 | 9/2012 | Norair |
| 2012/0224543 A1 | 9/2012 | Norair |
| 2012/0224590 A1 | 9/2012 | Norair |
| 2012/0225687 A1 | 9/2012 | Norair |
| 2012/0226822 A1 | 9/2012 | Norair |
| 2012/0226955 A1 | 9/2012 | Norair |
| 2013/0017788 A1 | 1/2013 | Norair |
| 2013/0210461 A1 | 8/2013 | Moldaysky |
| 2015/0009967 A1 | 1/2015 | Norair |
| 2015/0124628 A1 | 5/2015 | Norair |

OTHER PUBLICATIONS

PCT International Searching Authority, Notification Concerning Transmittal of the International Search Report and the Written Opinion of the International Searching Authority, or the Declaration, in International application No. PCT/US11/55082, dated Mar. 1, 2012 (13 pages).

PCT International Searching Authority, Notification Concerning Transmittal of the International Search Report and the Written Opinion of the International Searching Authority, or the Declaration, in International application No. PCT/US11/55934, dated Mar. 6, 2012 (11 pages).

PCT International Searching Authority, Notification Concerning Transmittal of the International Search Report and the Written Opinion of the International Searching Authority, or the Declaration, in International application No. PCT/US2011/055929, dated Jan. 30, 2012. (15 pages).

PCT International Searching Authority, Notification Concerning Transmittal of the International Search Report and the Written Opinion of the International Searching Authority, or the Declaration, in International application No. PCT/US2011/059292, dated Feb. 2, 2012. (12 pages).

PCT International Searching Authority, Notification Concerning Transmittal of the International Search Report and the Written Opinion of the International Searching Authority, or the Declaration, in International application No. PCT/US11/059304, dated Mar. 9, 2012 (11 pages).

PCT International Searching Authority, Notification Concerning Transmittal of the International Search Report and the Written Opinion of the International Searching Authority, or the Declaration, in International application No. PCT/US2011/060950, dated Mar. 16, 2012. (14 pages).

PCT International Searching Authority, Notification Concerning Transmittal of the International Search Report and the Written Opinion of the International Searching Authority, or the Declaration, in International application No. PCT/US12/22005, dated Mar. 29, 2012. (12 pages).

PCT International Searching Authority, Notification Concerning Transmittal of the International Search Report and the Written Opinion of the International Searching Authority, or the Declaration, in International application No. PCT/US12/22002, dated May 8, 2012. (13 pages).

PCT International Searching Authority, Notification Concerning Transmittal of the International Search Report and the Written Opinion of the International Searching Authority, or the Declaration, in International application No. PCT/US2012/025191 dated May 25, 2012 (8 pages).

PCT International Searching Authority, Notification Concerning Transmittal of the International Search Report and the Written Opinion of the International Searching Authority, or the Declaration, in International application No. PCT/US2012/025197 dated May 25, 2012 (7 pages).

PCT International Searching Authority, Notification Concerning Transmittal of the International Search Report and the Written Opinion of the International Searching Authority, or the Declaration, in International application No. PCT/US2012/027382 dated May 31, 2012 (10 pages).

PCT International Searching Authority, Notification Concerning Transmittal of the International Search Report and the Written Opinion of the International Searching Authority, or the Declaration, in International application No. PCT/US2012/027381 dated May 31, 2012 (13 pages).

PCT International Searching Authority, Notification Concerning Transmittal of the International Search Report and the Written Opinion of the International Searching Authority, or the Declaration, in International application No. PCT/US2012/027387 dated Jun. 6, 2012 (14 pages).

PCT International Searching Authority, Notification Concerning Transmittal of the International Search Report and the Written Opinion of the International Searching Authority, or the Declaration, in International application No. PCT/US2012/27378 dated Jun. 13, 2012 (14 pages).

PCT International Searching Authority, Notification Concerning Transmittal of the International Search Report and the Written Opinion of the International Searching Authority, or the Declaration, in International application No. PCT/US2012/027379 dated Jun. 20, 2012 (16 pages).

(56) References Cited

OTHER PUBLICATIONS

PCT International Searching Authority, Notification Concerning Transmittal of the International Search Report and the Written Opinion of the International Searching Authority, or the Declaration, in International application No. PCT/US2012/027384 dated Jun. 20, 2012 (10 pages).

PCT International Searching Authority, Notification Concerning Transmittal of the International Search Report and the Written Opinion of the International Searching Authority, or the Declaration, in International application No. PCT/US2012/046894 dated Sep. 27, 2012.

PCT International Searching Authority, Notification Concerning Transmittal of the Int'l Search Report and the Written Opinion of the Int'l Searching authority or the Declaration in Int'l application No. PCT/US2012/027386 dated Oct. 16, 2012.

Norair JP (2009). Introduction to DASH7 Technologies 1st Edition. Whitepaper. Mar. 16, 2009. 1-22.

Richard MacManus. DASH7: Bringing Sensor Networking to Smartphones. readwrite.com. Apr. 11, 2010. pp. 1-5.

"Mapping IP Multicast to MAC-Layer Multicast" TechNet Microsoft Library (1 pages).

* cited by examiner

| 230 → | Header 302 | $T_{SD}$ 304 | Search Spec 306 | Level 1 Parameters 308 | Level 2 Parameters 310 |

FIG. 3A

| 234 → | Header 322 | $T_{SD}$ 324 | Search Spec 326 | Level N Parameters 328 | Response ACKs 330 |

FIG. 3B

| 232 → | Header 332 | $T_{DBD}$ 334 | Return Data 336 |

FIG. 3C

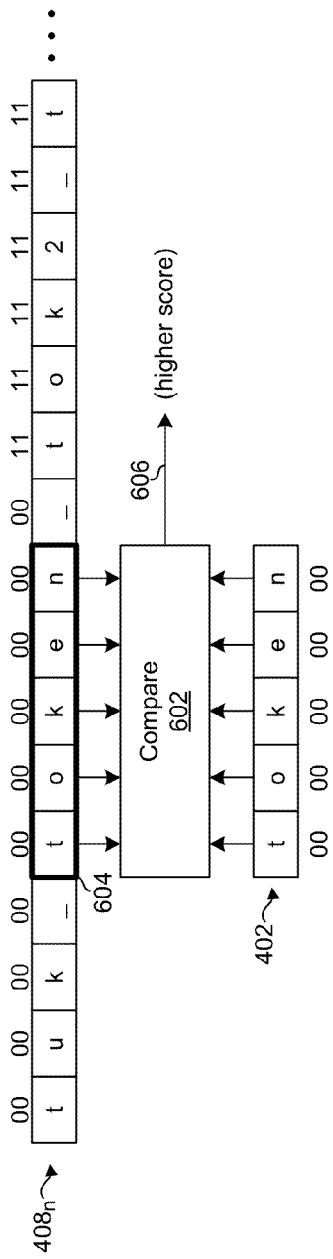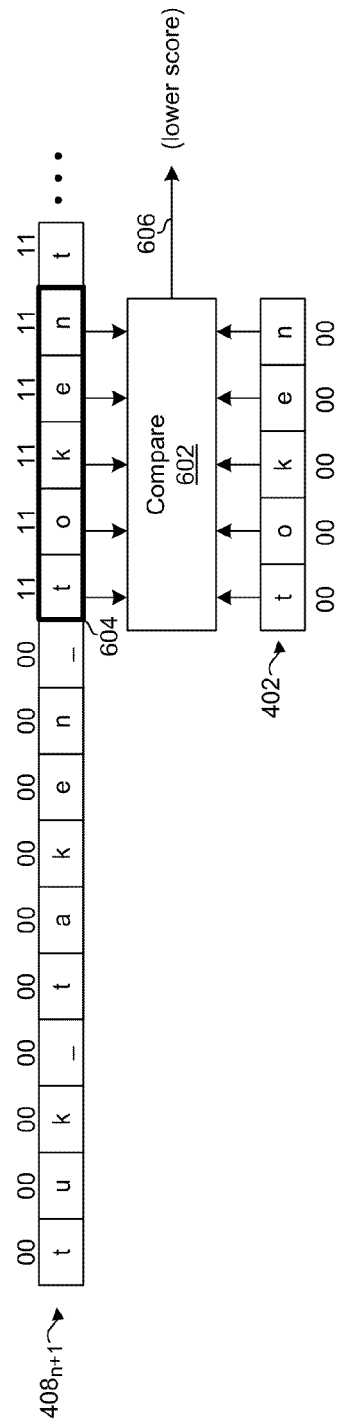

METHOD AND APPARATUS FOR ADAPTIVE SEARCHING OF DISTRIBUTED DATASETS

CLAIM OF PRIORITY

This patent application is a continuation of U.S. application Ser. No. 13/267,640, filed Oct. 6, 2011, now U.S. Pat. No. 8,976,691, which makes reference to, claims priority to and claims benefit from U.S. Provisional Patent Application Ser. No. 61/404,513 filed on Oct. 6, 2010.

The above stated application is hereby incorporated herein by reference in its entirety.

INCORPORATION BY REFERENCE

This patent application also makes reference to:
U.S. Provisional Patent Application Ser. No. 61/464,376 filed on Mar. 2, 2011.

Each of the above stated applications is hereby incorporated herein by reference in its entirety.

FIELD OF THE INVENTION

Certain embodiments of the invention relate to wireless communications. More specifically, certain embodiments of the invention relate to a method and apparatus for adaptive searching of distributed datasets.

BACKGROUND OF THE INVENTION

Conventional methods of searching distributed datasets are inefficient in terms of both resource usage and power consumption. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

An apparatus and/or method is provided for adaptive searching of distributed datasets, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

FIGS. 3A-3C depict an exemplary packet structure for searching a distributed dataset.

FIGS. 6C-6D illustrates the use of weighting factors in generating search scores.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". For example, "x and/or y" means any element of the three-element set $\{(x), (y), (x, y)\}$. Similarly, for example, "x, y, and/or z" means any element of the seven-element set $\{(x), (y), (z), (x, y), (x, z), (y, z), (x, y, z)\}$. As utilized herein, the term "module" refers to functions than can be implemented in hardware, software, firmware, or any combination of one or more thereof. As utilized herein, the term "exemplary" means serving as a non-limiting example, instance, or illustration. As utilized herein, "e.g.," introduces a list of one or more non-limiting examples, instances, or illustrations.

Figure 1:
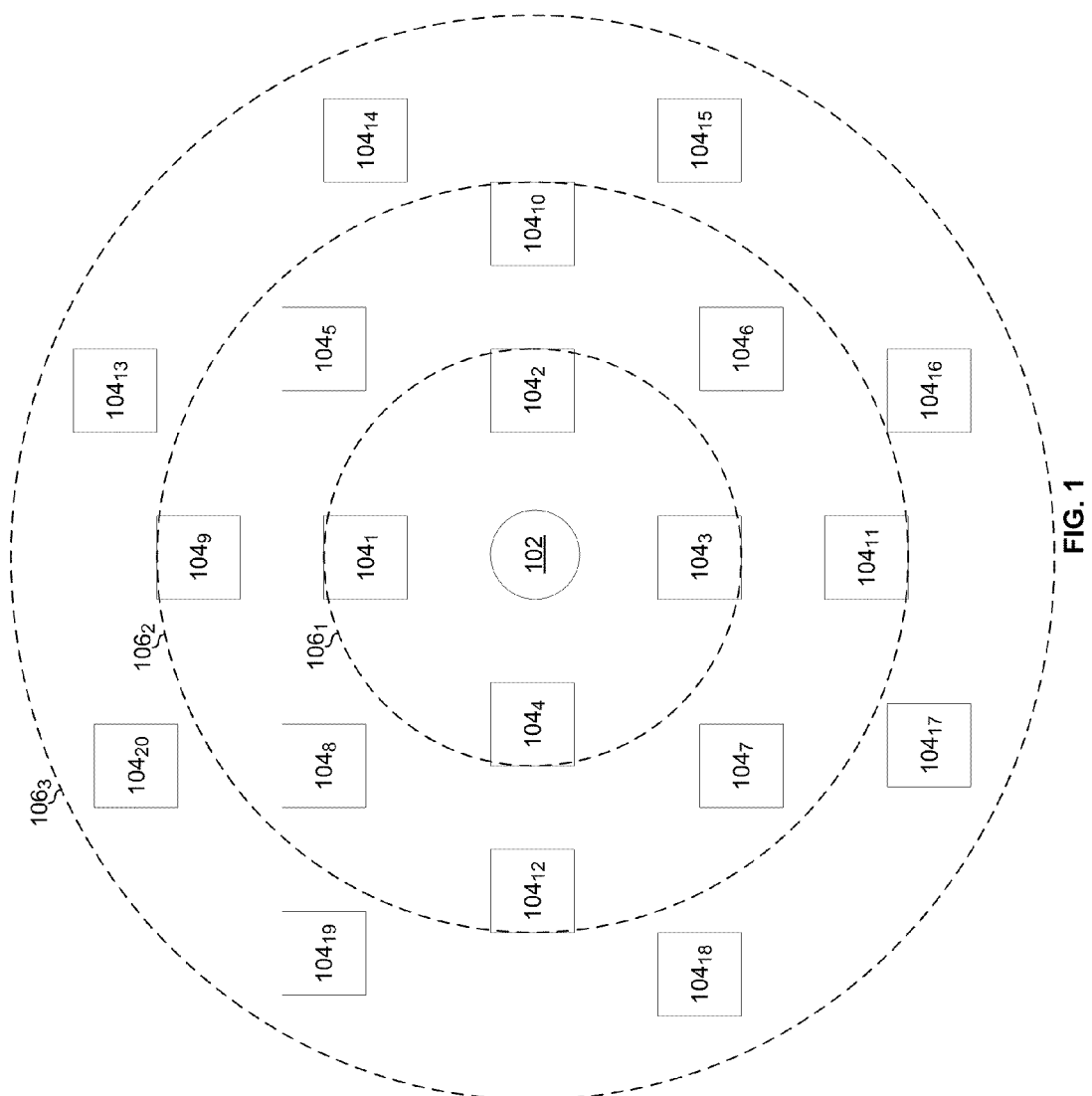
FIG. 1 is a diagram depicting a plurality of spatially-distributed, resource-constrained devices.

FIG. 1 is a diagram depicting a plurality of spatially-distributed, resource-constrained devices. Shown in FIG. 1 is a first device 102, second devices $104_1$-$104_{20}$, and search perimeters $106_1$-$106_3$.

The first device 102 may comprise circuitry operable to transmit and receive wireless signals in accordance with one or more wireless protocols. Exemplary protocols which may be supported by the device 102 include the ISO 18000-7 protocol, and protocols described in the above-incorporated U.S. Provisional Patent Application No. 61/464,376 filed on Mar. 2, 2011. The first device 102 may also comprise circuitry operable to implement a user interface such as the user interface described below with respect to FIGS. 5A-5C. Accordingly, the first device 102 may be operable to generate and transmit search requests, and receive and process search responses. When executing a search, the first device 102 is referred to herein as a "searching device." The first device 102 may, for example and without limitation, be a laptop computer, a desktop computer, a tablet computer, a smart phone, a server, a set-top box, a gateway, a meter or code reader, or may comprise a combination of one or more such devices.

Each of the second devices $104_1$-$104_{20}$ may comprise circuitry operable to transmit and receive wireless signals in accordance with one or more wireless protocols. Exemplary protocols which may be supported by the second devices $104_1$-$104_{20}$ include the ISO 18000-7 standard, and protocols described in the above-incorporated U.S. Provisional Patent Application No. 61/464,376 filed on Mar. 2, 2011. Each of the second devices $104_1$-$104_{20}$ may comprise circuitry operable to store data (e.g., in the form of delimited strings of characters). Accordingly, the second devices $104_1$-$104_{20}$ are referred to herein as "data-bearing devices." Additionally, device $104_X$ (X being an integer between 1 and 20, inclusive) may comprise circuitry operable to search data stored on the device $104_X$. One or more of the second devices $104_1$-$104_{20}$ may have relatively little memory, relatively little processing power, operate on battery power, and/or may otherwise be constrained in terms of one or more resources. The second devices $104_1$-$104_{20}$ may, for example, comprise RFID tags, smartcards, keyfobs, cellphones, portable media players, appliances, utility meters, etc.

The search perimeters $106_1$-$106_3$ represents different "search areas" for the first device 102 corresponding to three different transmit powers. That is, the device 102 may utilize a first transmit power $T_1$ to search devices within the first search perimeter $106_1$, utilize a second transmit power $T_2$ to search devices within the second search perimeter $106_2$, and utilize a third transmit power $T_3$ to search devices within the third search perimeter $106_3$, wherein $T_3 > T_2 > T_1$.

In operation, the first device 102 (the "searching device") may desire to search at least a portion of the devices $104_1$-$104_{20}$. The search may be, for example, to find which one or more of the devices $104_1$-$104_{20}$ have a particular string (e.g., a group of one or more ASCII or UNICODE characters) stored in memory. The first device 102 may generate a search request packet and transmit the search request packet. If the search request packet is transmitted at power $T_1$, the search request packet may be received by data-bearing devices $104_1$-$104_4$. If the search request packet is transmitted at power $T_2$, the search request packet may be received by devices $104_1$-$104_{12}$. If the search request packet is transmitted at power $T_3$, the search request packet may be received by devices $104_1$-$104_{20}$. Note that the above assumes signal propagation conditions in which there is no interference or physical obstructions that critically impair communications between the device 102 and one or more of the devices $104_1$-$104_{20}$.

The first device 102 may receive search response packets from one or more of the devices $104_1$-$104_{20}$. The device 102 may process the responses, and may send one or more follow-up search request packets to refine and/or narrow the search results, and/or to acknowledge successfully received search responses. The acknowledgment may comprise a batch acknowledgment where responses received from a plurality of the devices $104_1$-$104_{20}$ are acknowledged in a single packet.

Each of the devices $104_1$-$104_{20}$ that receives the search request packet may react and/or respond in accordance with instructions and/or parameters received in the search request packet. One or more of the devices $104_1$-$104_{20}$ may, for example, determine that a search of their memory is unnecessary, and/or that the search, or communication of the search results, would be too resource-intensive. Such devices may, for example, ignore the search request and not respond to it. One or more others of the devices $104_1$-$104_{20}$ may, for example, determine to search their entire memory or one or more particular portions of their memory. Of the devices $104_1$-$104_{20}$ that do perform a search of their memories, some may respond to the search and some may not. Those of the devices $104_1$-$104_{20}$ that do respond may generate and transmit one or more search response packets. The contents of the search response packet may be determined, at least in part, by the parameters and/or instructions in the received search request packet. The power at which the search response is transmitted may be based, at least in part, on the received signal strength of the search request packet and/or the contents of the search request packet.

For those of the devices $104_1$-$104_{20}$ that perform the search, a decision to generate a search response packet may be based on a search score. A device $104_X$ may generate a search score based on a mathematical and/or logical comparison of a search string received in a search request packet with one or more strings stored in memory of the device $104_X$. In some instances, the search score may be based, at least in part, on a weighting factor applied to one or more of the strings stored in the memory of the device $104_X$.

For those of the devices $104_1$-$104_{20}$ that transmit a search response, when and/or on what channel they transmit the response may be based on the search score. For example, devices having higher-scoring responses may be given priority to access the medium. Additionally or alternatively, a device $104_X$ having a higher-scoring response may transmit on a different time and/or frequency channel than a device having a lower-scoring response.

A device $104_X$ that transmitted a search response may listen for an acknowledgement that its response was received by the requestor. The behavior of the device $104_X$ if it does not receive an acknowledgment may vary depending on, for example, instructions in the search request packet. For example, if the device $104_X$ that transmitted a response does not receive an acknowledgment, that device $104_X$ may retransmit its response and/or may, for a period of time, ignore subsequent searches from the same searching device.

Figure 2:
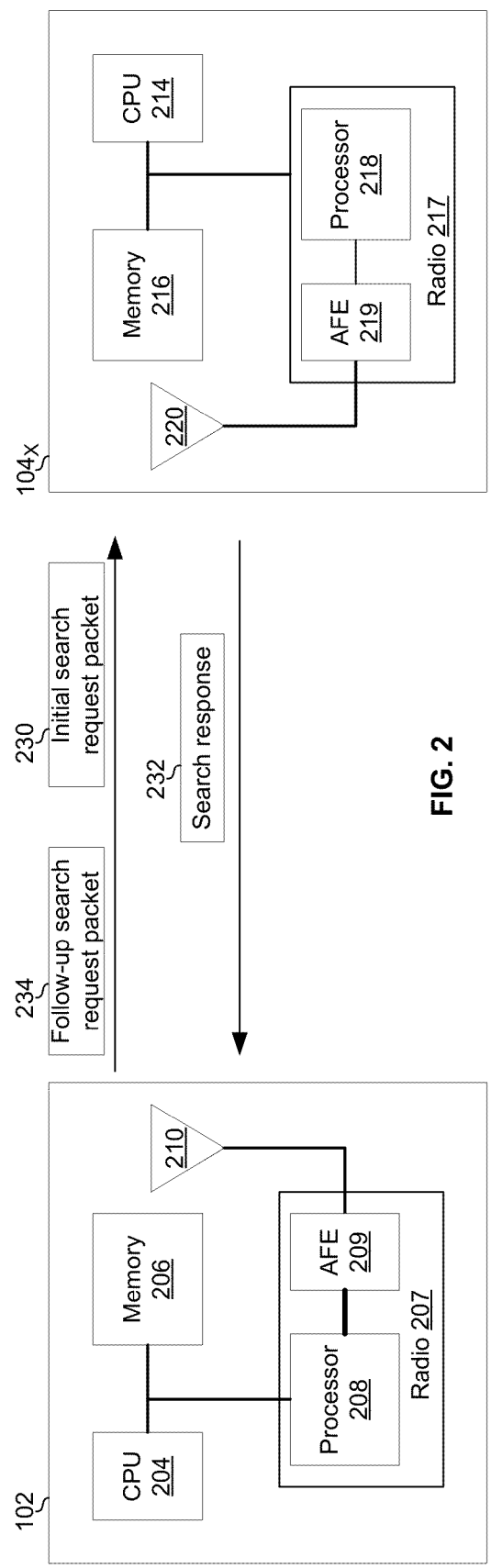
FIG. 2 depicts an exemplary searching device and an exemplary data-bearing device.

FIG. 2 depicts an exemplary searching device and an exemplary data-bearing device. Shown in FIG. 2 are details of an exemplary first device 102 and details of an exemplary second device $104_X$.

The CPU 204 may comprise circuitry operable to control operation of the first device 102. The CPU 204 may, for example, execute an operating system and/or other programs such (e.g., programs that enable a user interface of the device 102). The CPU 204 may generate one or more control signals for controlling the operation of the device 102. The CPU 204 may, for example, control a mode of operation of the device 102.

The CPU 214 may comprise circuitry operable to control operation of the second device $104_X$. In some instances, the CPU 214 may be substantially similar to the CPU 204. In instances that the device $104_X$ is resource-constrained, the CPU 204 may be less-complex (e.g., comprise fewer gates, utilize less power, utilize less memory, etc.) than the CPU 214. In one embodiment, for example, the CPU 204 may comprise a RISC or ARM processor, and the CPU 214 may comprise a state-machine having a relatively small number of states (e.g., four states).

The radio 207 may comprise a processor 208 and an analog front-end (AFE) 209. The processor 208 may comprise circuitry operable to interface with the AFE 209 to receive and transmit data, and to process received and to-be-transmitted data. For transmission, the processor 208 may be operable to receive data from the CPU 204 and/or memory 206, packetize and/or otherwise process the data to prepare it for transmission in accordance with one or more wireless protocols, and output the data to the AFE 209 for transmission. For reception, the processor 208 may be operable to receive data via the AFE 209, process the received data and output received data to the memory 206 and/or the CPU 204. Exemplary protocols which may be supported by the second device $104_X$ include the ISO 18000-7 standard, and protocols described in the above-incorporated U.S. Provisional Patent Application No. 61/464,376 filed on Mar. 2, 2011.

The radio 217 may comprise a processor 218 and an analog front-end (AFE) 219. The baseband processor 218 may comprise circuitry operable to interface with the AFE 219 to receive and transmit data, and to process received and to-be-transmitted data. In some instances, the baseband processor 218 may be substantially similar to the baseband processor 208. In instances that the device $104_X$ is resource-constrained, the baseband processor 218 may be less-complex (e.g., comprise fewer gates, utilize less power, utilize less memory, etc.) than the baseband processor 208. In one embodiment, for example, the baseband processor 208 may be operable to implement more complex signal processing algorithms than the baseband processor 218.

The analog front-end (AFE) 209 may comprise circuitry suitable for processing received and/or to-be-transmitted data in the analog domain. For transmission, the AFE 209 may receive digital data from the baseband processor 208, process the data to generate corresponding RF signals, and output the RF signals to the antenna 210. For reception, the AFE 209 may receive RF signals from the antenna 210, process the RF signals to generate corresponding digital data, and output the digital data to the baseband processor 209. In some instances, the AFE 219 may be substantially similar to the AFE 209. In instances that the device $104_X$ is resource-constrained, the AFE 219 may be less-complex (e.g., comprise fewer gates, utilize less power, utilize less memory, etc.) than the AFE 209. In one embodiment, for example, the AFE 209 may comprise a more-sensitive receiver, a more powerful transmitter than the AFE 219.

Circuitry of the memory 206 may comprise one or more memory cells and may be operable to store data to the memory cell(s) and read data from the memory cell(s). The one or more memory cell may comprise one or more volatile memory cells and/or one or more non-volatile memory cells.

Circuitry of the memory 216 may comprise one or more memory cells and may be operable to read data from the memory cell(s) and/or store data to the memory cell(s). In some instances, the memory 216 may be substantially similar to the memory 206. In instances that the device $104_X$ is resource-constrained, the memory 216 may be less-complex (e.g., comprise fewer gates, utilize less power, etc.) than the memory 206.

Each of the antennas 210 and 220 may be operable to transmit and receive electromagnetic signals in one or more frequency bands. In an embodiment of the invention, the antennas 210 and 220 may be operable to transmit and receive signals in the ISM frequency band centered at 433.92 MHz.

In operation, a user of the device 102 may initiate a search by, for example, utilizing the user interface described below with respect to FIGS. 7A-7C. Based on the user's input, a search request packet 230 may be generated by the device 102 and transmitted via the antenna 210. The device $104_X$ may receive the search request packet 230 and determine whether to perform the requested search, and whether to respond to the search request. In instances that the device $104_X$ does decide to respond to the request, it may generate a search response packet 232, and transmit the search response packet 232 via the antenna 220. The device $104_X$ may also generate and transmit a follow-up search request packet 234. The device $104_X$ may respond to the follow-up search request with one or more additional search response packets 232.

FIGS. 3A-3C depict an exemplary packet structure for searching a distributed dataset. Shown in FIG. 3A is an exemplary structure of an initial search request packet 230. Shown in FIG. 3B is an exemplary structure of a follow-up search request packet 234. Shown in FIG. 3C is an exemplary structure of a search response packet 232.

The exemplary initial search request packet 230 comprises a header field 302, a transmit power field 304, a search specification field 306, a level-1 parameters field 308, and a level-2 parameters field 310.

The header field 302 may comprise protocol-specific data.

The transmit power field 304 may indicate (e.g., via a numerical value) the measured and/or estimated power at which the search request packet 230 was transmitted by the searching device.

The search specification field 306 may comprise numerical and/or string-based information that instruct the data-bearing devices as to how a search is to be conducted. The search specification field 306 may, for example, indicate what data should be searched, what data should be returned, when responses should be transmitted (e.g., respond to the current search request packet or wait for a future search request packet), on what channel responses should be transmitted, a bit-mask for modifying search one or more search tokens and/or search results, and/or whether the current packet is part of a new search or a continuation of a search.

The level-1 parameters field 308 may comprise one or more search tokens for which to search in the data-bearing devices. Each token may, for example, comprise a number and/or a string.

The level-2 parameters field 310 may comprise one or more search tokens for which to search in the data-bearing devices which found a match for the token(s) in the level-1 parameters field. Each token may, for example, comprise a number and/or a string.

The exemplary follow-up search request packet 234 comprises a header field 322, a transmit power field 324, a search specification field 326, a level-N parameters field 328, and a batch acknowledgment field 330.

The header field 322 may comprise protocol-specific data.

The transmit power field 324 may indicate (e.g., via a numerical value) the measured and/or estimated power at which the follow-up search request packet 234 was transmitted by the searching device.

The search specification field 326 may comprise numerical and/or string-based information that instruct the data-bearing devices as to, for example, what data should be searched, what data should be returned, when responses should be transmitted (e.g., respond to the current search request packet or wait for a future search request packet), on what channel responses should be transmitted, and whether the current packet is part of a new search or a continuation of a search.

The level-N parameters field 328 may comprise one or more search tokens for which to search in data-bearing devices which found a match for the tokens in the first N−1 parameters fields. In an exemplary embodiment of the invention, N=F+2 and F is an integer equal to the number follow-up search request packets 234 sent for a particular search. For example, N may be '3' for the first follow-up search packet of a search.

The exemplary search response packet 232 may comprise a header field 332, a transmit power field 334, and a return data field 336.

The header field 332 may comprise protocol-specific data.

The transmit power field 334 may indicate (e.g., via a numerical value) the measured and/or estimated power at which the search response packet 232 was transmitted by the data-bearing device.

The return data field 336 may comprise information about the results of the search. For example, the return data field 336 transmitted by a device $104_X$ may comprise string(s) found in memory of the device $104_X$ that match or partially match one or more search tokens, the location in memory of the found string(s), and/or the search score(s) for the found string(s). The contents and/or format of the return data field 336 may be determined, at least in part, by the search specification field 306 or 326 of the search request packet 230 or 234 that resulted in the response packet 232 being generated and transmitted.

Figure 4A:
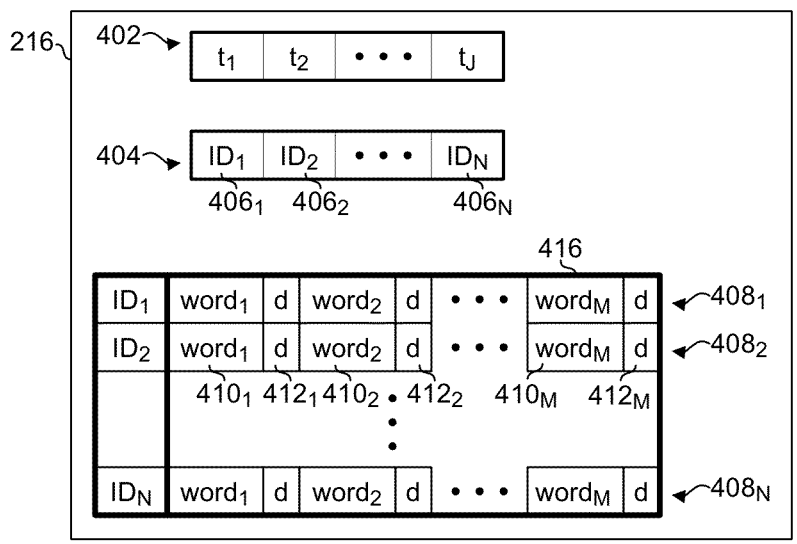
FIGS. 4A-4B depict an exemplary data structure stored in a data-bearing device.
Figure 4B:
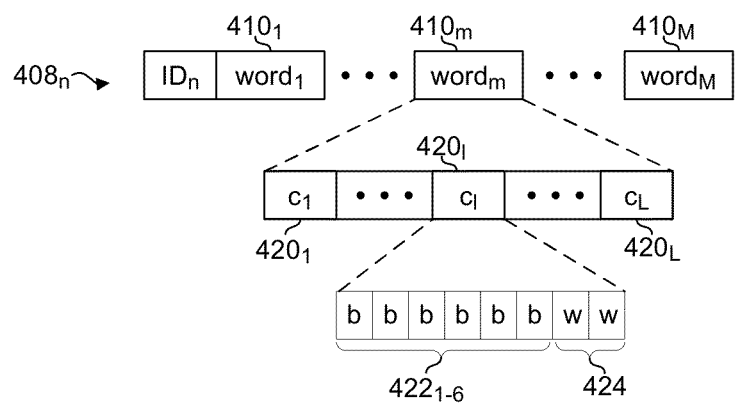

FIGS. 4A-4B depict an exemplary data structure stored in a data-bearing device. Referring to FIG. 4A, the memory 216 comprises a buffer 402, a list 404, and a table 416.

The buffer 402 may store a search token for which the memory 216 is to be searched. In FIG. 4A, the buffer can store a search token having up to J characters, where J is an integer.

The list 404 may store identifiers $406_1$-$406_N$ which may correspond and/or be mapped to a table index and/or a memory address of the corresponding strings $408_1$-$408_N$ in the table 416. Each of the identifiers $406_1$-$406_N$ may comprise, for example, a number and/or a string of characters.

The table 416 may store strings $408_1$-$408_N$. The strings may be indexed by the identifiers $406_1$-$406_N$. Each string $408_n$ (where n is an integer between 1 and N, inclusive) may comprise a plurality of words 410 and delimiters 412. In FIG. 4A, each of the strings $408_1$-$408_N$ comprises M words and a corresponding M delimiters, where M is an integer, but the invention is not so limited. Each string $408_n$ may have any number of words.

Referring to FIG. 4B, each of the words $410_1$-$410_m$ may comprise a plurality of characters 420. For example, an exemplary word $410_m$ (where m is an integer between 1 and M, inclusive) comprises L characters $420_1$-$420_L$. Each of the characters 420 may comprise a plurality of bits 422 and a weighting factor 424. In an exemplary embodiment of the invention, characters may be encoded utilizing six bits and a two-bit weighting factor 424. Additional details of such an encoding are described with respect to FIG. 5.

Figure 5:
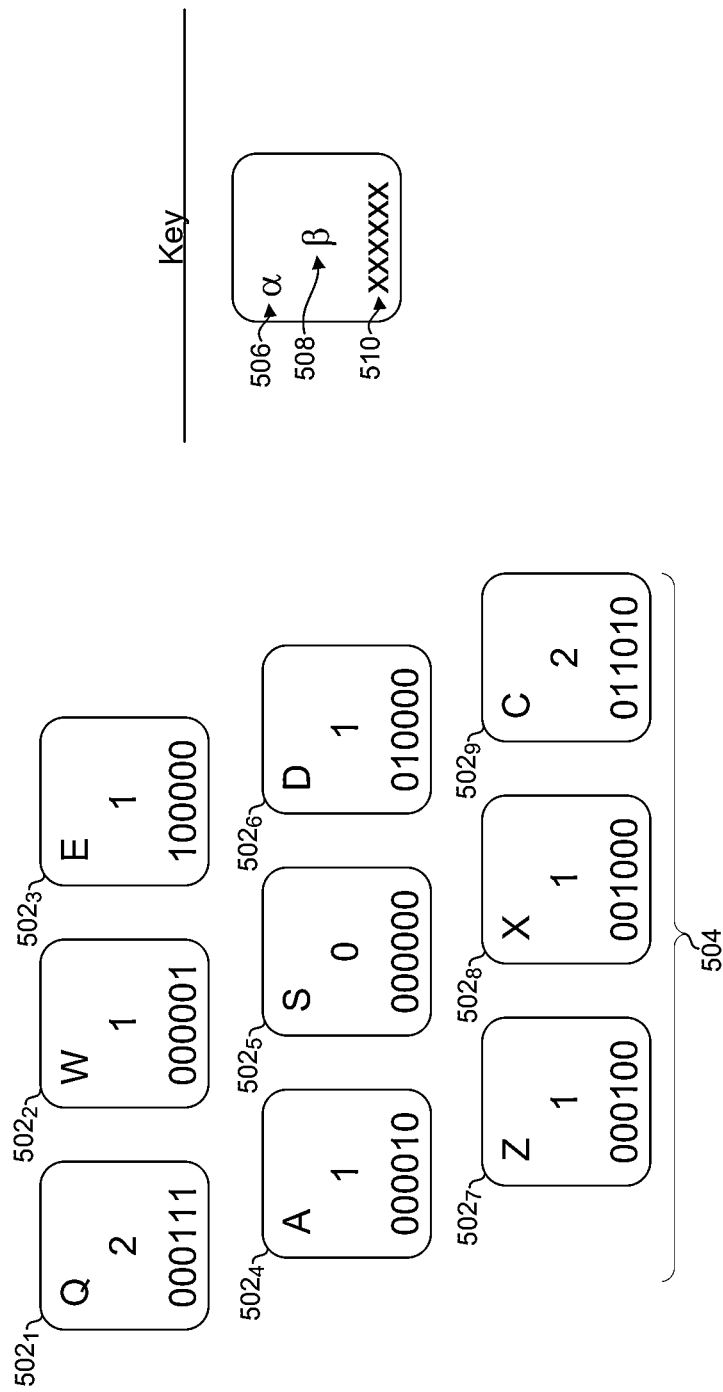
FIG. 5 depicts an exemplary encoding scheme for searching a distributed dataset.

FIG. 5 depicts an exemplary encoding scheme for searching a distributed dataset. Shown in FIG. 5 is a portion 505 of a keypad. Just a portion of the keypad is shown for illustration, but the 6-bit encoding scheme discussed here can apply to any keypad having up to $2^6$ characters. Similarly, larger keypads can be accommodated by using more than six bits and smaller keypads can be accommodated utilizing fewer than six bits.

The depicted portion 504 comprises the keys $502_1$-$502_9$. Shown on each key $502_C$ (where C is an integer between 1 and 9) is the character 506 corresponding to the key $502_C$, the 6-bt encoding of the key $502_C$, and a relative physical distance 508 of the key $502_C$ from a reference key (here, the key $502_5$).

The encoding 510 of each character is chosen such that the hamming distance between two keys is proportional (either linearly of according to some higher-order polynomial) to the relative physical distance between the two keys. To illustrate, in the embodiment depicted in FIG. 5, the hamming distance between key $502_5$ and keys with relative distance '1' (i.e., keys $502_2$, $502_3$ $502_4$, $502_6$, $502_7$, and $502_8$) is less than 2, and the hamming distance between key $502_5$ and keys with relative distance '2' (i.e., keys $502_1$, and $502_9$) is less than 4.

By encoding the characters such that the hamming distances between the encodings is proportional (either linearly of according to some higher-order polynomial) to the relative physical distance between the corresponding keys, spell-checking algorithms can utilizing the hamming distances to quickly and efficiently correct for likely typographical errors resulting from accidentally hitting a nearby key. For example, a user may enter "BISS" and the spell-checking algorithm may first check encodings corresponding to the smallest hamming distances. This may lead to the spellchecker suggesting "BIAS" and "BIDS" each of which differs from BISS by a hamming distance of only 1. Other possibilities such as "BINS" have a larger hamming distance and thus may be filtered out or may be suggested after "BIAS" and "BIDS."

Figure 6A:
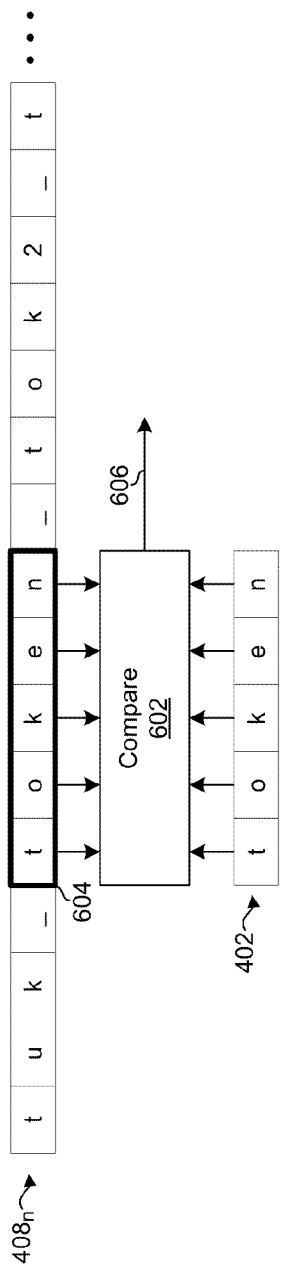
FIGS. 6A-6B depict an exemplary search performed in a data-bearing device.
Figure 6B:
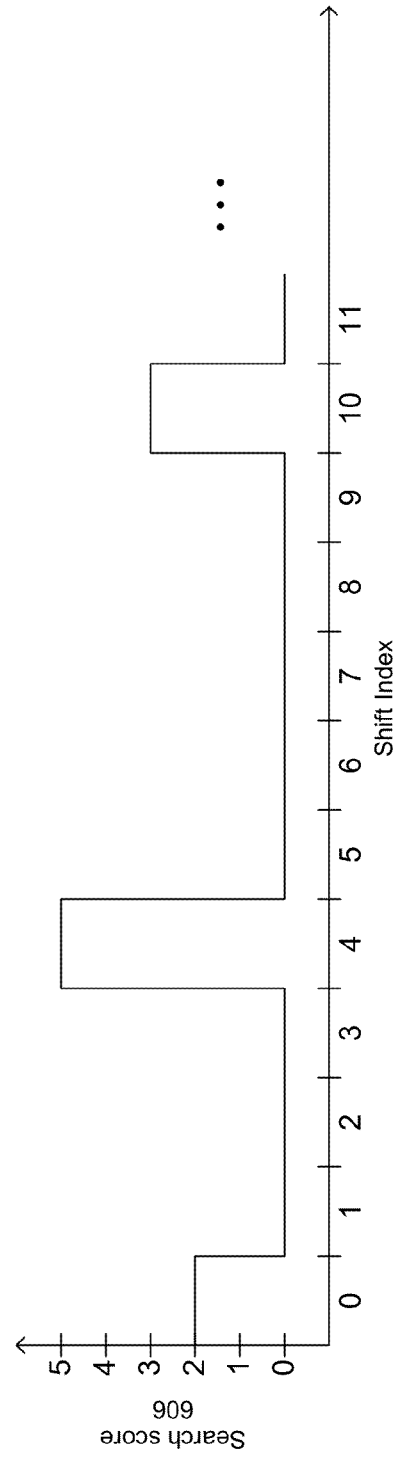

FIGS. 6A-6B depict an exemplary search performed in a data-bearing device. Referring to FIG. 6A, there is shown a compare module 602, an exemplary string $408_n$, and the buffer 402 which stores a token being searched for in the string $408_n$.

The compare module 602 may be operable to compare the contents of the buffer 402 to the portion of the string $408_n$ in the window 604 to generate the search score 606. The comparison may comprise, for example, exclusively-NORing the encoded-characters of the token with the encoded-characters of the string $408_n$ that are currently in the window 604, and then summing the outputs of the XNOR operations.

FIG. 6B illustrates the value of the search score 606 for the depicted portion of the exemplary string $408_n$. With reference to FIGS. 6A and 6B, the string $408_n$ is being searched for the token "token." At time 0, the characters "tuk_t" (where "_" represents a delimiter such as a space) are in the window 604 and the search score 606 has a normalized value of 3. At time 1, the characters "uk_to" are in the window 604, and the search score 606 has a normalized value of 0. At time 2, the characters "k_tok" are in the window 604, and the search score 606 has a normalized value of 0. At time 3, the characters "_toke" are in the window 604, and the search score 606 has a normalized value of 0. At time 4, the characters "token" are in the window 604, and the search score 606 has a normalized value of 5. And so forth until the entire string $408_n$ has been compared to the token.

FIG. 6C illustrates the use of a weighting factor in generating search scores. As described above, each character in the strings $408_n$ and $408_{n+1}$ may have one or more weighting bits appended to it. In an exemplary embodiment of the invention, the weights may be represented as two bits. In FIG. 6C, the weight of each character is shown above that character. Also, each character of the search token may have one or more weighting bits appended to it. In FIG. 6C, the weight of each token character is shown below that character.

In an exemplary embodiment of the invention, characters may be emphasized or de-emphasized based on an exclusive-NORing of the weighting factors. For example, each character in the search token may have a weight of "00," and each character in the strings $408_n$ and $408_{n+1}$ may have a weight of "00," "01," "10," or "11." A weighting factor of "00" may emphasize a character, a weighting factor of "10" and "01" may be neutral, and a weighting factor of "11" may de-emphasize a character.

In FIGS. 6C-6D, words near the beginning of a string (toward the left of the drawing sheet) are weighted more heavily than words later in the string. The search token, "token," is found earlier in the string $408_n$ whereas "token" is found later in the string $408_{n+1}$. If each character of the search token has a weight of '00,' the characters of "token" in the string $408_n$ each have a weight of '00,' and each of the characters of "token" in string $408_{n+1}$ have a weight of '11' the search score for string $408_n$ may be higher than the search score for the string $408_{n+1}$.

In one embodiment of the invention, one or more characters of the search token may be replaced by a wildcard character. Bits corresponding to a wildcard character may be masked out when calculating the search score and, therefore, not factor into the search score.

Figure 7A:
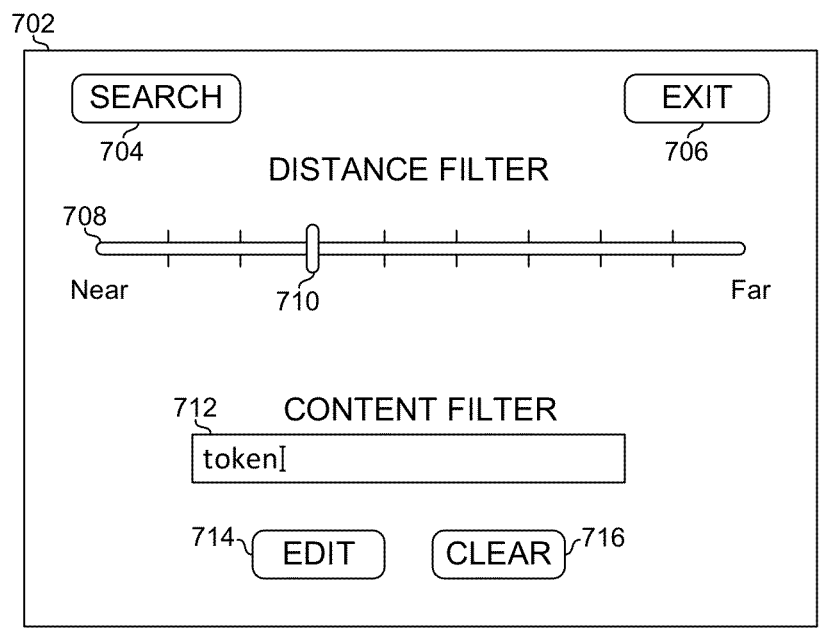
FIGS. 7A-7C depict an exemplary user interface for searching a distributed dataset.
Figure 7B:
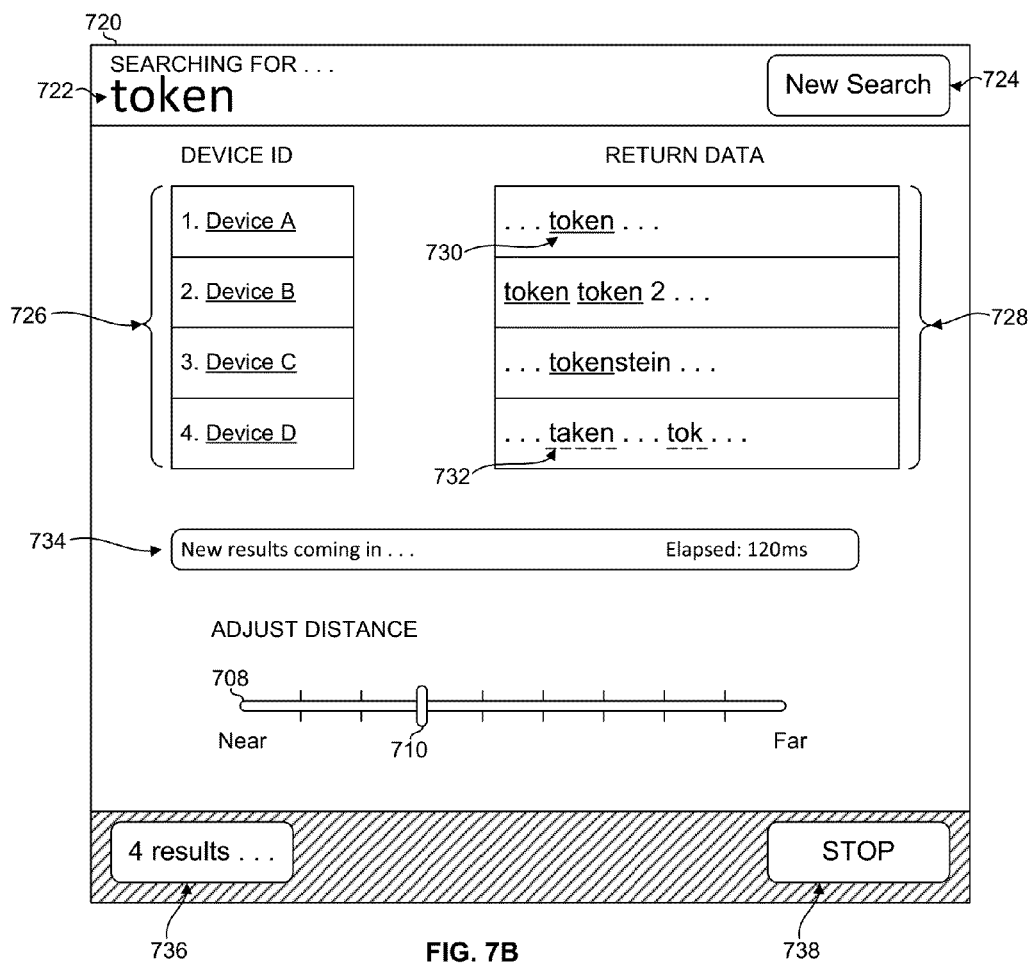
Figure 7C:
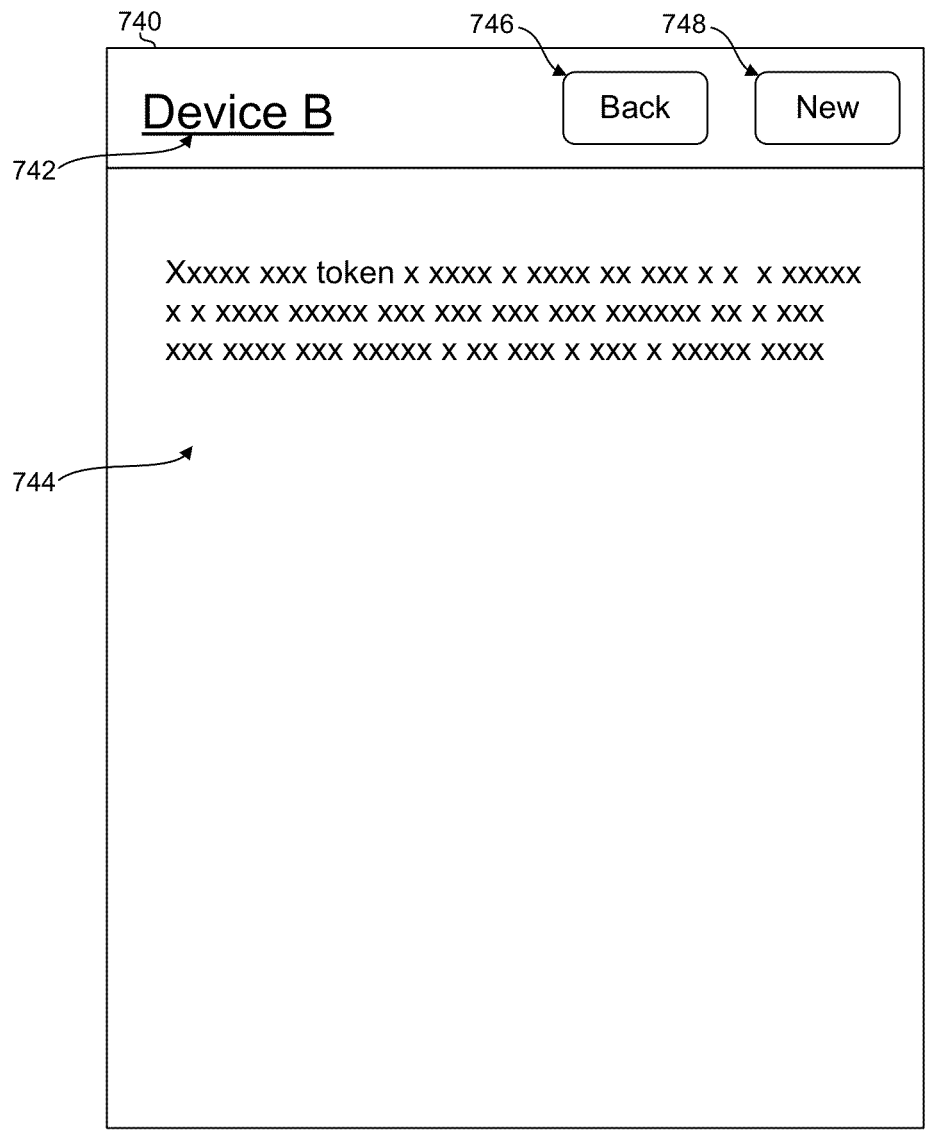

FIGS. 7A-7C depict an exemplary user interface for searching a distributed dataset. Shown in FIG. 7A is a first window (or screen) 702 of a graphical user interface (GUI) of a search program that performs searches of distributed datasets. The GUI may be run on, for example, the device 102 of FIGS. 1 and 2. The underlying search program with which the GUI interfaces may run on the device 102 as well, or may run on a host device in communication with the device 102. The first window 702 comprises a search button 704, an exit button 706, a slider bar 708, a slider 710, a textbox 712, an edit button 714, and a clear button 716.

The slider bar 708 may provide a graphical representation of transmit power. The farther to the right that the slider 710 is on the slider bar 708, the higher the transmit power at which search packets will be transmitted. The position of the slider 710 may be configured manually by a user and/or automatically based on one or more computer-implemented algorithms. Such algorithms may determine the position of the slider dynamically during operation of the device on which the search program is running. Such algorithms may determine the position of the slider 710 based, for example, on a known location of the user (e.g., through base station triangulation, GPS, and/or user-entered data), external input from one or more sensors (e.g., RF energy incident on the device 102), and/or input from other programs running on the device 102.

In operation, a user may launch the search program which, in turn, brings up the window 702. The user may activate (e.g., click, press or otherwise select) the clear button 716 to remove any persistent information from a previous search. The user may activate the edit button 714 to bring up a cursor in the textbox 712. The user may type one or more search tokens into the textbox 712. The slider 710 may be automatically adjusted, and/or the user may manually adjust it, to select a transmit power for the search. The user may then activate the search button 704 to initiate the search. Initiating the search may then bring up the window or screen 720 shown in FIG. 7B. If the user desires to exit the search program, the user may activate the exit button 706.

Referring to FIG. 7B, the window 720 comprises fields 722, 726, 728, 734, and 736, buttons 724 and 738, and the slider bar 708 and slider 710.

The field 722 may display the search token(s) being searched for as part of the current search.

The field 726 may display the unique identifiers (e.g., alphanumeric names and/or unique serial numbers) of devices 104 which have responded to the search. The devices IDs may, for example, be listed in descending order according to search score. Each device ID may be a button or hyperlink which, when activated, may bring the user to the window (or screen) 740 described below with respect to FIG. 7C.

The field 728 may display returned search data. In the embodiment shown, the returned search data is the strings in which matches (indicated by solid underlining 730), and partial matches (indicated by dashed underlining 732), to the search token were found.

The field 734 may display the status of the search. For example, the field 734 may display a first message while the search is in-progress and a second message when the search has completed. The field 735 may also display the amount of time for the search.

The slider bar 708 and slider 710 may be as described above with respect to FIG. 7A. In an embodiment of the invention, the search may be adjusted manually and/or automatically while the search is in-progress. For example, if too many results are coming in, the slider 710 may move to the left during a search.

The field 736 may provide a brief summary of the search results. The stop button 738 may terminate an in-progress search. The button 724 may stop a search and return the user to the window 702 described above with respect to FIG. 7B.

Referring to FIG. 7C, the window 740 comprises fields 742 and 744, and buttons 746 and 748. The field 742 displays the ID of the device for which search results are being displayed in field 744. The field 744 displays data received search result information. The displayed data may be directly from the data-bearing device ("Device B" in FIG. 7C) or may be downloaded from an external source (e.g., a server) where the data is stored. The button 746, when activated, may return the user to the window 720 described above with respect to FIG. 7B. The button 748 may return the user to the window 702 described above with respect to FIG. 7A.

Figure 8:
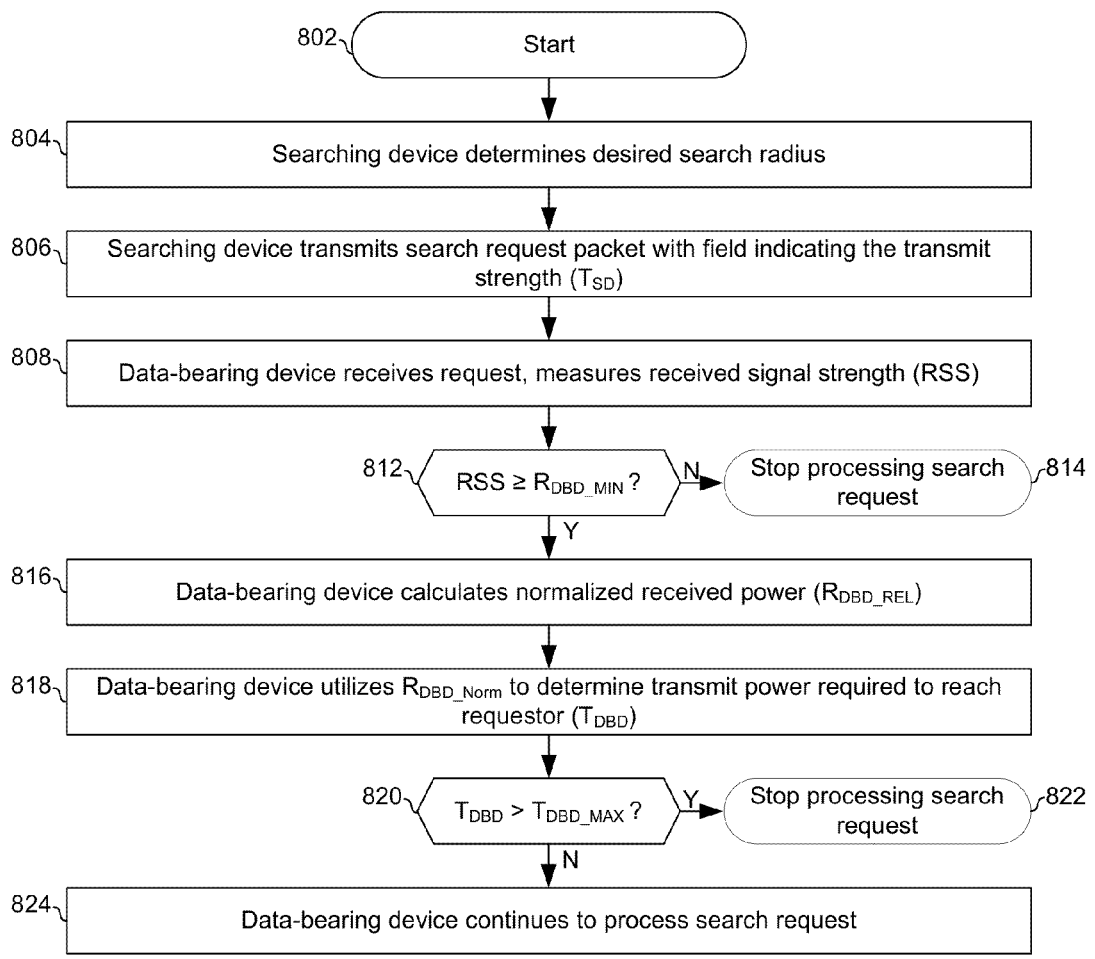
FIG. 8 is a flowchart depicting exemplary steps for link-power-aware searching of a distributed dataset.

FIG. 8 is a flowchart depicting exemplary steps for link-power-aware searching of a distributed dataset. In step 804, after start step 802, a searching device (e.g., device 102) may determine a desired search radius. The determination may be made based on, for example and without limitation, past search results, a location of the searching device, the data to be searched for, and/or a variety of other factors.

In step 806, the searching device may transmit a search request packet. The search request packet may comprise a field (e.g., the field 304) that indicates the transmit power ($T_{SD}$) at which the search request packet was transmitted.

In step 808, a data-bearing device (e.g., device $104_x$) may receive the search request packet and measure the received signal strength (RSS) of the search request packet.

In step 812, data-bearing device compares the RSS to a minimum received power threshold ($R_{DBD\_MIN}$). The minimum received power threshold may, for example, have been configured based on one or more parameters such as, for example, the location of the data-bearing device, the type of data stored in the data-bearing device, the search specification and/or parameters of the received search request packet, and/or the total and/or remaining charge on a battery of the data-bearing device. If the RSS is below $R_{DBD\_MIN}$, then the exemplary steps may advance to step 814, and the data-bearing device may stop processing the search request. If the RSS is above or equal to $R_{DBD\_MIN}$, then the exemplary steps may advance to step 816.

In step 816, the data-bearing device may calculate a relative power ($R_{DBD\_REL}$) for the received search packet. The relative power may be calculated by, for example, subtracting RSS from $T_{SD}$.

In step 818, the data bearing device may utilize $R_{DBD\_REL}$ to determine a transmit power ($T_{DBD}$) that would be required for a response from the data-bearing device to reach the searching device.

In step 820, the transmit power required to respond to the search request may be compared to a maximum power at which the data-bearing device is capable and/or permitted to transmit ($T_{DBD\_MAX}$). $T_{DBD\_MAX}$ may, for example, be determined based on a size and/or charge of a battery of the data-bearing device, based on a location of the data-bearing device, based on the type of data stored in the data bearing device, based on a search specification and/or search parameters of the received search request, and/or one or more other parameters. If $T_{DBD}$ is above or $T_{DBD\_MAX}$, then the exemplary steps may advance to step 822, and the data-bearing device may stop processing the search request. If $T_{DBD}$ is below or equal to $T_{DBD\_MAX}$, then the exemplary steps may advance to step 824, and the data-bearing device may continue processing the search request.

Figure 9A:
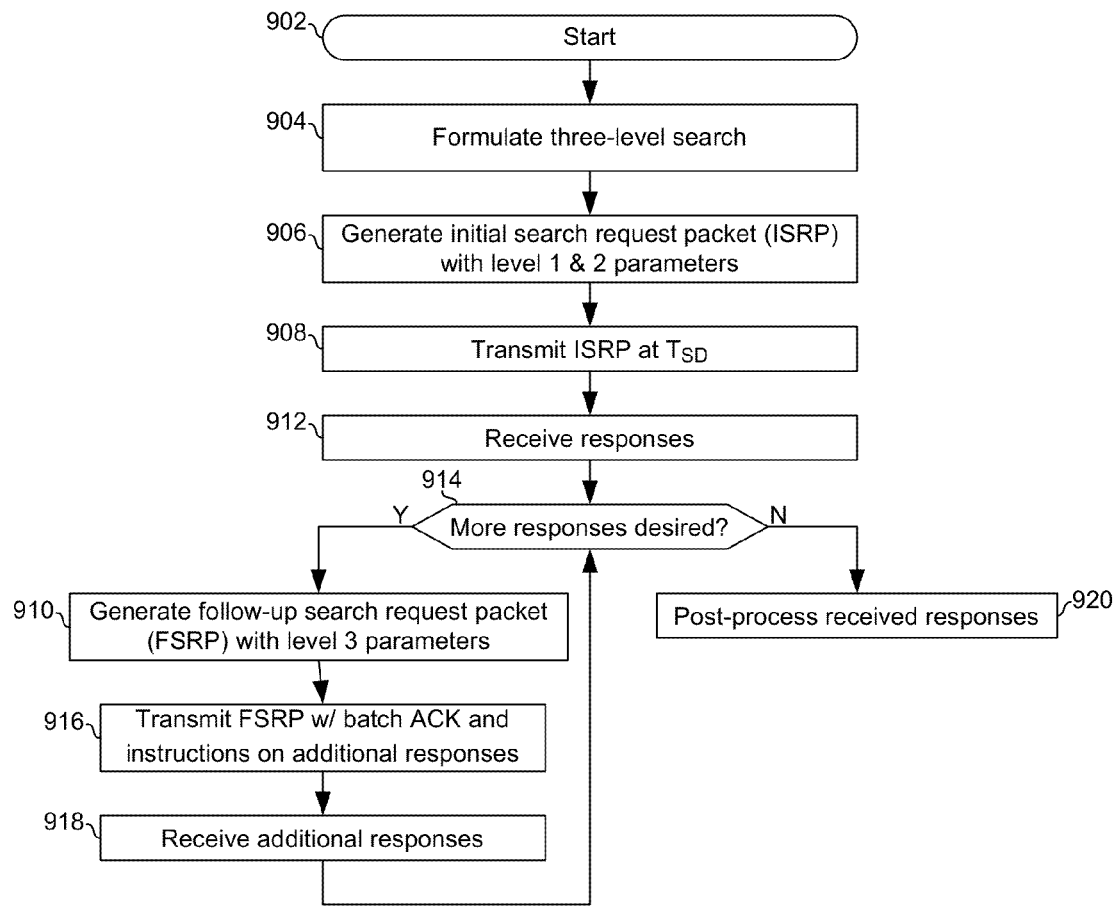
FIG. 9A is a flowchart depicting exemplary steps implemented by a device that is performing a search of a distributed dataset.

FIG. 9A is a flowchart depicting exemplary steps implemented by a device that is performing a search of a distributed dataset. The exemplary steps depict a three-level search for illustration, but the invention is not limited to any particular number of search levels.

In step 904, after start step 902, a searching device (e.g., device 102) may formulate a three-level search. For example, the searching device may want to find data-bearing devices that have the following characteristics: (1) "group"="1234," (2) "subgroup"="5678;" and (3) "cookies"="ABC" is stored in memory.

In step 906, the searching device may generate an initial search request packet (ISRP) comprising a level-1 parameter field indicating that the searching device is searching for data-bearing devices in which the string with the identifier "group" has the value "1234," and a level-2 parameter field indicating that the searching device is searching for data-bearing devices in which the string with the identifier "subgroup" has the value "5678." The search specification field of the ISRP may indicate that a follow-up search request packet (FSRP) will be sent and responses should be held off until after received of the FSRP.

In step 908, the ISRP may be transmitted at a transmit power $T_{SP}$. The transmit power $T_{SD}$ may, for example, be determined as described in one or more of FIGS. 7A, 7B, 7C, and 8.

In step 910, the searching device may receive search responses.

In step 912, the searching device may determine whether it wants to receive additional responses. If not, the exemplary steps may advance to step 920 and the searching device may process the received responses. If so, then the exemplary steps may advance to step 914.

In step 914, the FSRP may be generated. The FSRP may comprise a level-3 parameter field indicating that the searching device is searching for data-bearing devices in which a string with a string ID of "cookies" contains the substring "ABC." The search specification field of the FSRP may indicate the manner in which responses should be formatted and/or sent. In scenarios in which there are more than three levels to a search, steps 914-918 may be stepped-through multiple times and the search level associated with step 914 may be incremented on each iteration through steps 914-918. For example, for a four-level search, step 914 may correspond to level-3 parameters (as shown) for the first iteration through steps 914-918, and may correspond to level-4 parameters on the second iteration through steps 914-918.

In step 916, the searching device may transmit an additional FSRP. The FSRP may acknowledge the successfully-received responses and may instruct the data-bearing devices on if and/or how to respond. For example, the FSRP may instruct devices whose responses were sent but not acknowledged to retransmit their responses. Additionally or alternatively, the FSRP may instruct devices who were unable to transmit a response (e.g., due to inability to gain access to the medium) to make another attempt to send their responses.

In step 918, the searching device may receive the additional responses and the exemplary steps may return to step 912.

Figure 9B:
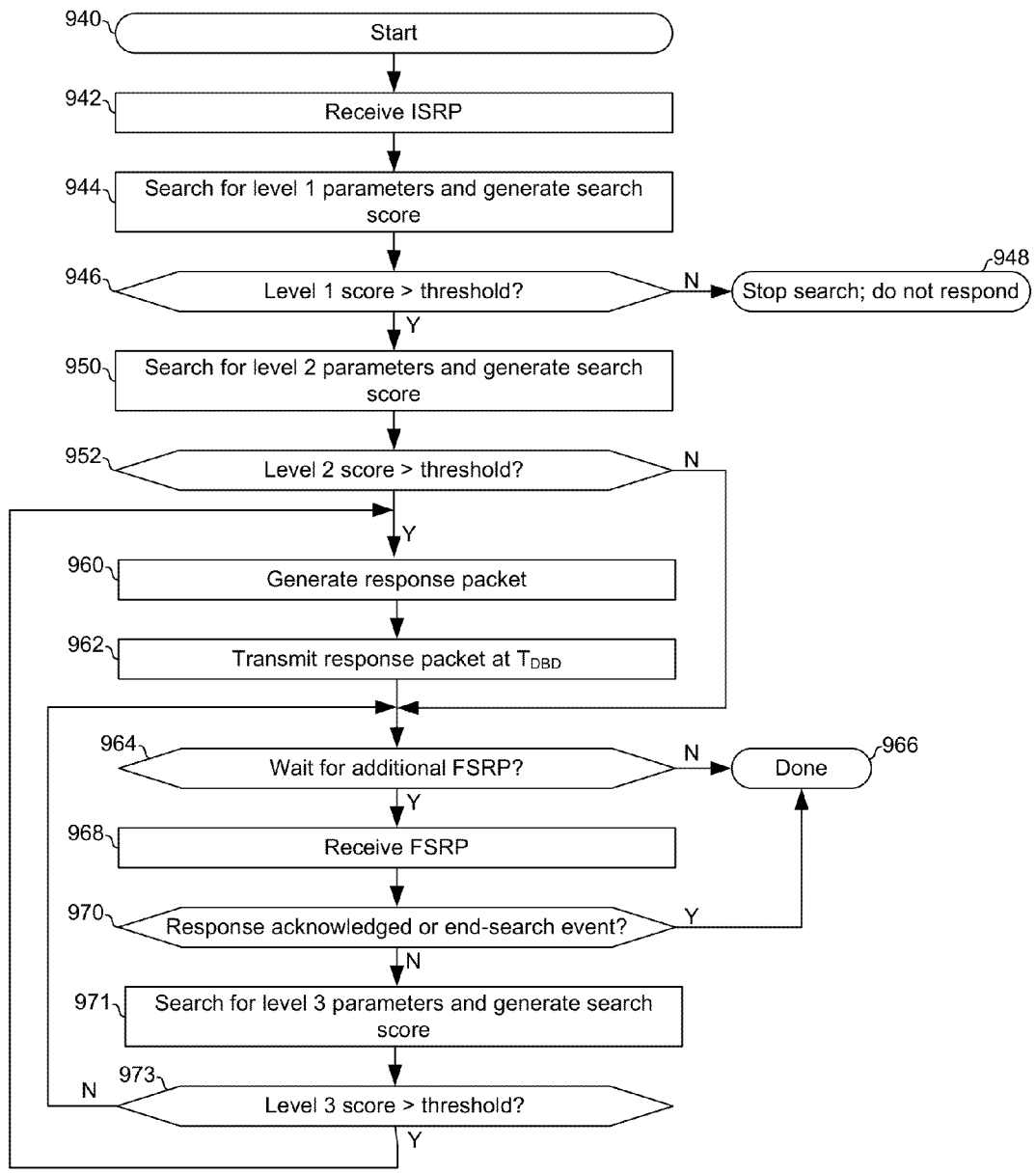
FIG. 9B is a flowchart depicting exemplary steps implemented by a data-bearing device in response to a received search request.

FIG. 9B is a flowchart depicting exemplary steps implemented by a data-bearing device in response to a received search request. Whereas the flowchart of FIG. 9A illustrates an exemplary search from the perspective of the searching device, the flowchart of FIG. 9B illustrates exemplary steps of the same search from the perspective of a data-bearing device.

In step 942, after start step 940, the data-bearing device (e.g., device $104_X$) may receive the ISRP and parse it to obtain the level-1 tokens "group" and "1234," and level-2 tokens "subgroup" and "5678."

In step 944, the data-bearing device may search for the token "group" in the list 404 and if, found search for the token "1234" in the corresponding string $408_n$. A search score may be generated based on whether "group" was found in list 404, and if and/or where "1234" was found in string $408_n$.

In step 946, if the level-1 search score is less than a first threshold, then, in step 946, the data-bearing device may stop processing the ISRP and may not listen to subsequent packets of the current search. Conversely, if the level-1 search score is greater than the first threshold, the exemplary steps may advance to step 950. The first threshold may, for example, be determined based on the search specifications of the ISRP.

In step 950, the data-bearing device may search for the level-2 tokens and generate a search score.

In step 952, if the level-2 search score is less than a second threshold, then, in step 948, the data-bearing device may stop processing the ISRP and may not listen to subsequent packets of the current search. Conversely, if the level-2 search score is greater than the second threshold, the exemplary steps may advance to step 964. The second threshold may, for example, be determined based on the search specifications of the ISRP. The second threshold may or may not be the same as the first threshold.

In step 960, the data-bearing device may generate a search response packet. The contents and/or format of the return data field may be based, for example, on one or more search specification fields of the received ISRP and FSRP. When and/or on what channel the response is transmitted may be based, for example, on one or more search specification fields of the received ISRP and FSRP.

In step 962, the response packet may be transmitted at a transmit power $T_{DBD}$.

In step 964, if the search specification(s) of the ISRP and/or FSRP instructed the data-bearing device that it should not wait for one or more additional FSRPs, the exemplary steps may advance to step 966 and the search may be complete.

Returning to step 964, if the search specification(s) of the ISRP and/or FSRP instructed the data-bearing device that it should wait for one or more additional FSRPs, then the exemplary steps may advance to step 968.

In step 968, the data-bearing device may receive a next FSRP. In scenarios in which there are more than three levels to a search, steps 960-973 may be stepped-through multiple times, and the number of the FSRP received in step 968 may be incremented on each iteration through steps 960-973. For example, for a four-level search, second FSRP comprising level-3 search parameters may be received in a first iteration of step 968, and a third FSRP comprising level-4 search parameters may be received in a second iteration of step 968.

In step 970, if the response transmitted in step 962 is acknowledged in the second FSRP, if the FSRP instructs the data-bearing device that the search is complete, and/or if some other event (e.g., a timeout) signals the end of the current search, then the exemplary steps may advance to step 966.

Returning to step 970, if the second FRSP does not acknowledge the response transmitted in step 962, then steps may proceed to step 971.

In step 971, the data-bearing device may search for the level-3 parameter(s) and generate a search score. In scenarios in which there are more than three levels to a search, one or more of steps 960-973 may be executed multiple times, and the search level associated with step 971 may be incremented on each iteration of step 971. For example, for a four-level search, step 971 may correspond to level-3 parameters (as shown) for the first iteration of step 971, and may correspond to level-4 parameters on the second iteration of step 971.

In step 973, if the level-3 search score is less than a third threshold, then the exemplary steps may advance to step 964. Conversely, if the level-3 search score is greater than the third threshold, the exemplary steps may advance to step 960. The third threshold may, for example, be determined based on the search specifications of the FSRP. The third threshold may or may not be the same as one or both of the first threshold and the second threshold. In scenarios in which there are more than three levels to a search, one or more of steps 960-973 may be executed multiple times, and the search level associated with step 973 may be incremented on each iteration of step 973. For example, for a four-level search, step 973 may correspond to level-3 parameters (as shown) for the first iteration of step 973, and may correspond to level-4 parameters on the second iteration of step 973.

Figure 10A:
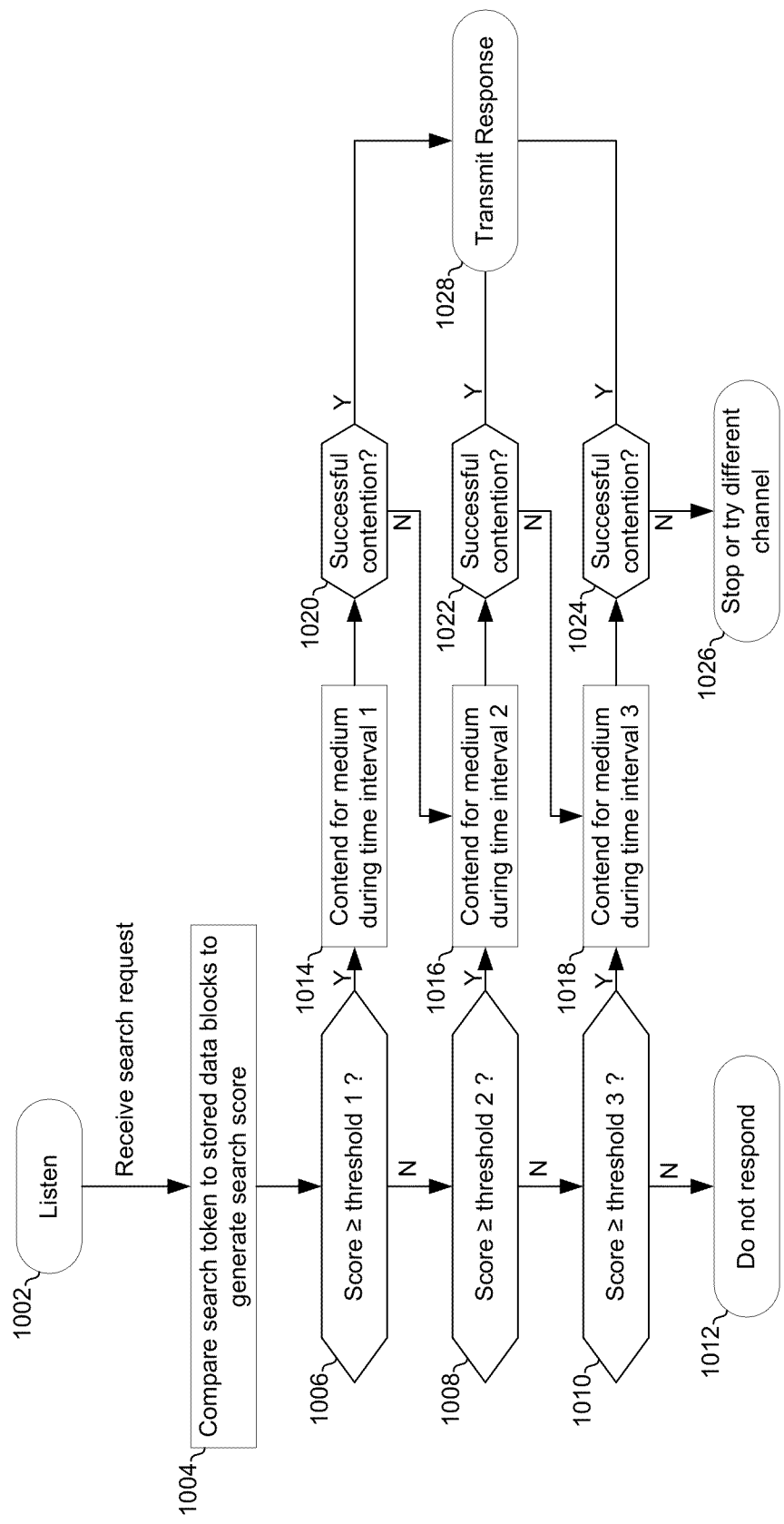
FIG. 10A is a flowchart depicting exemplary steps implemented by a data-bearing device in responding to a received search request.

FIG. 10A is a flowchart depicting exemplary steps implemented by a data-bearing device in responding to a received search request. In step 1002, the data-bearing device (e.g., device $104_X$) may be operating in a mode in which it is idle and listening. Upon the data-bearing device receiving an initial search request packet (ISRP) the exemplary steps may proceed to step 1004.

In step 1004, the data-bearing device may compare one or more search tokens to its memory contents, and generate a search score.

In step 1006, the data-bearing device may compare the search score to a first threshold. If the search score is greater than or equal to a first threshold, the exemplary steps may proceed to step 1014.

In step 1014, the data-bearing device may contend for access to the medium during a first time interval. The medium may, for example, be the air and the data-bearing device may be contending for access to a frequency channel in the ISM band centered at 433.92 MHz.

In step 1020, if the data-bearing device successfully obtains access to the medium, then, in step 1028, the data-bearing device may transmit the response packet during the first time interval.

Returning to step 1020, if the data-bearing device does not successfully obtain access to the medium, then, in step 1016, the data-bearing device may contend for access to the medium during a second time interval occurring after the first time interval. If the data-bearing device successfully obtains access to the medium, then, in step 1028, the data-bearing device may transmit the response packet during the second time interval.

Returning to step 1022, if the data-bearing device does not successfully obtain access to the medium, then, in step 1018, the data-bearing device may contend for access to the medium during a third time interval occurring after the second time interval. If the data-bearing device successfully obtains access to the medium, then, in step 1028, the data-bearing device may transmit the response packet during the third time interval.

Returning to step 1024, if the data-bearing device does not successfully obtain access to the medium, then, in step 1026, the data-bearing device may cease attempting to access the medium and/or may try to access the medium on a different channel.

Returning to step 1006, if the search score is less than the first threshold, then in step 1008 the search score may be compared to a second threshold. If the score is greater than or equal to the second threshold, then the exemplary steps may proceed to step 1016.

Returning to step 1008, if the search score is less than the second threshold, then in step 1010 the search score may be compared to a third threshold. If the score is greater than or equal to the third threshold, then the exemplary steps may proceed to step 1018. If the score is less than the third threshold, then, in step 1012, it may be determined that a response packet should not be sent.

Figure 10B:
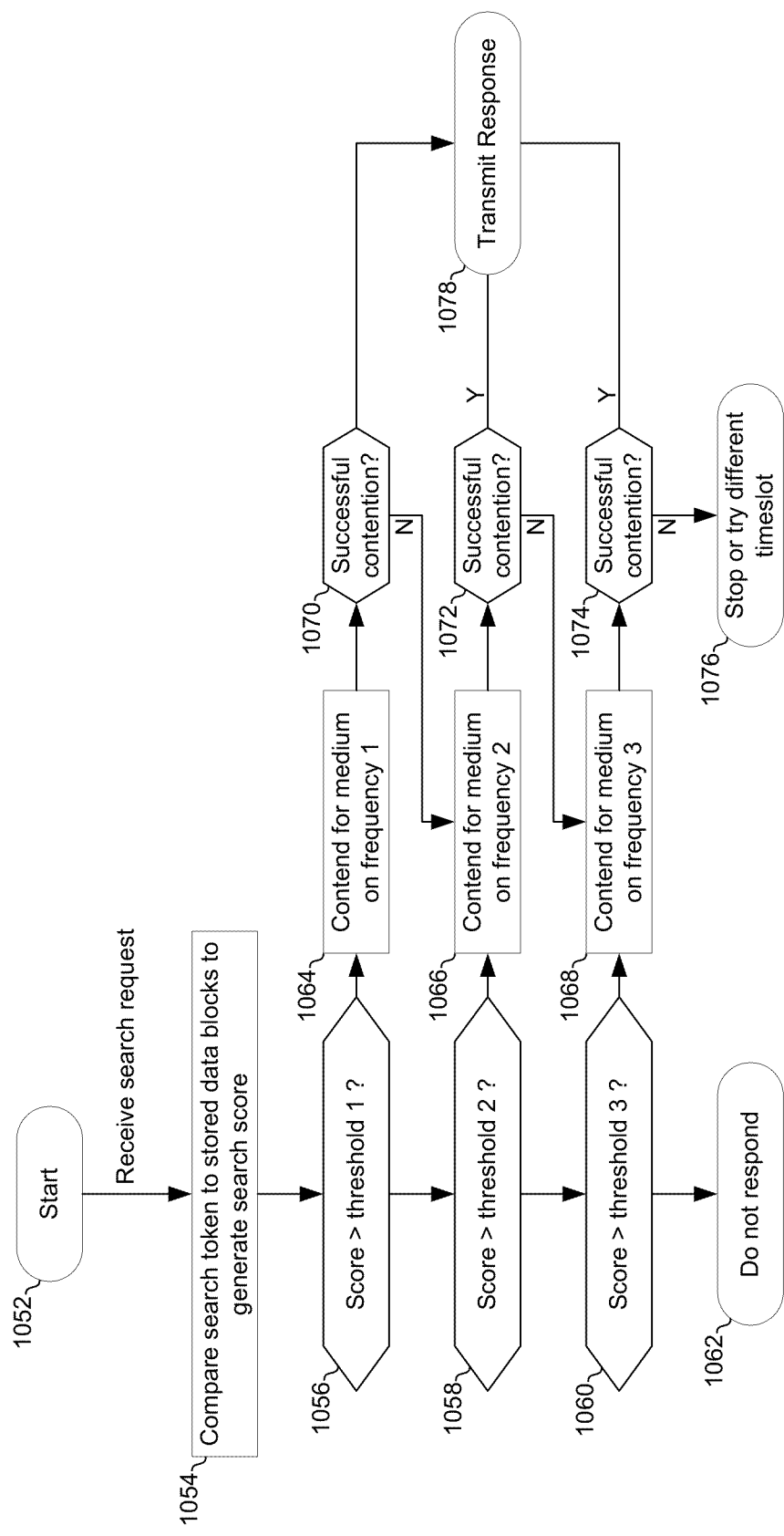
FIG. 10B is a flowchart depicting exemplary steps implemented by a data-bearing device in responding to a received search request.

FIG. 10B is a flowchart depicting exemplary steps implemented by a data-bearing device in responding to a received search request. In step 1052, the data-bearing device (e.g., device $104_X$) may be operating in a mode in which it is idle and listening. Upon the data-bearing device receiving an initial search request packet (ISRP) the exemplary steps may proceed to step 1054.

In step 1054, the data-bearing device may compare one or more search tokens to its memory contents, and generate a search score.

In step 1056, the data-bearing device may compare the search score to a first threshold. If the search score is greater than or equal to a first threshold, the exemplary steps may proceed to step 1064.

In step 1064, the data-bearing device may contend for access to the medium on a first channel. The medium may, for example, be the air, and the first channel may be in, for example and without limitation, the ISM band centered at 433.92 MHz.

In step 1070, if the data-bearing device successfully obtains access to the medium, then, in step 1078, the data-bearing device may transmit the response packet on the first channel.

Returning to step 1070, if the data-bearing device does not successfully obtain access to the medium, then, in step 1066, the data-bearing device may contend for access to the medium on a second channel. If the data-bearing device successfully obtains access to the medium, then, in step 1078, the data-bearing device may transmit the response packet on the second channel.

Returning to step 1072, if the data-bearing device does not successfully obtain access to the medium, then, in step 1068, the data-bearing device may contend for access to the medium on a third channel. If the data-bearing device successfully obtains access to the medium, then, in step 1078, the data-bearing device may transmit the response packet on the third channel.

Returning to step 1074, if the data-bearing device does not successfully obtain access to the medium, then, in step 1076, the data-bearing device may cease attempting to access the medium and/or may try to access the medium during a different time interval.

Returning to step 1056, if the search score is less than the first threshold, then in step 1058 the search score may be compared to a second threshold. If the score is greater than or equal to the second threshold, then the exemplary steps may proceed to step 1066.

Returning to step 1058, if the search score is less than the second threshold, then in step 1060 the search score may be compared to a third threshold. If the score is greater than or equal to the third threshold, then the exemplary steps may proceed to step 1068. If the score is less than the third threshold, then, in step 1012, it may be determined that a response packet should not be sent.

Figure 11A:
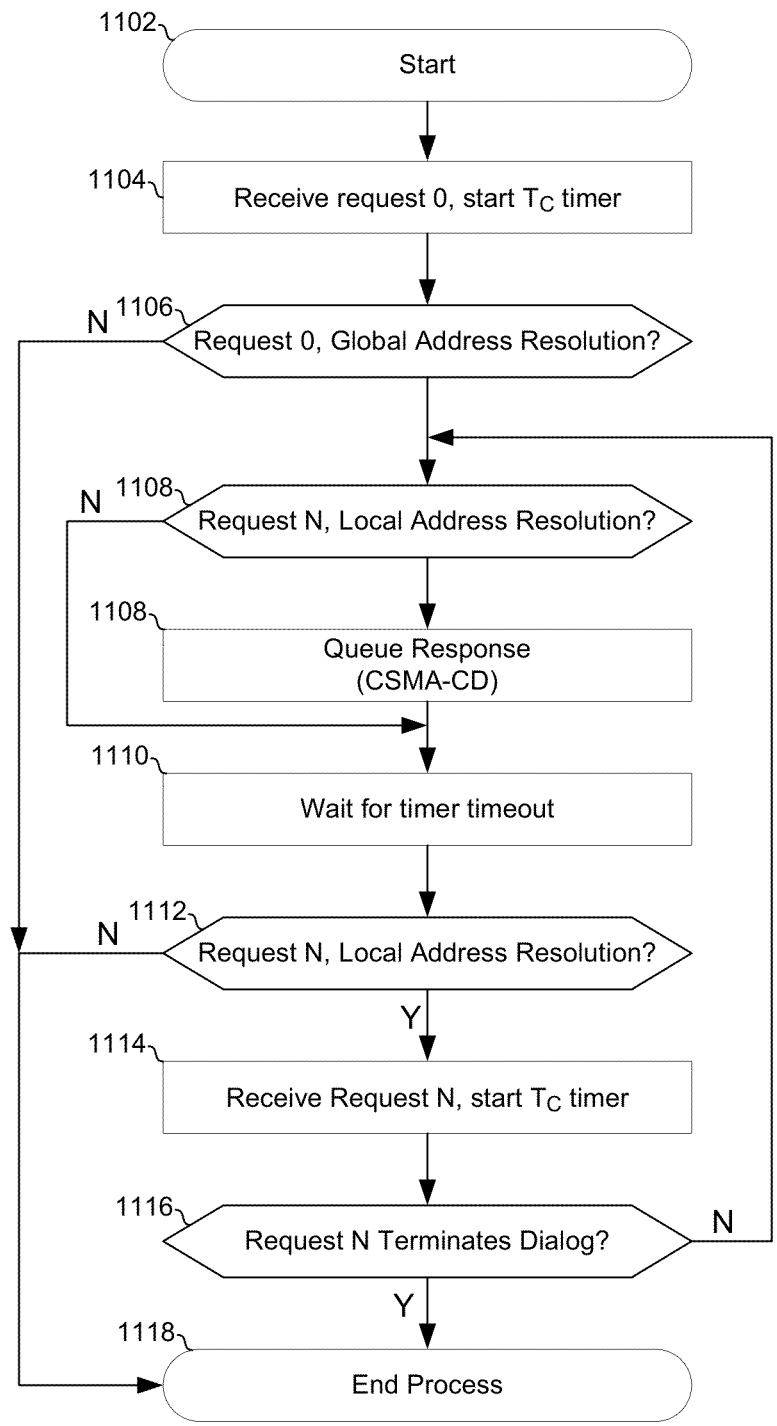
FIG. 11A illustrates exemplary steps performed by a responder in a two-party arbitrated dialogue.
Figure 11B:
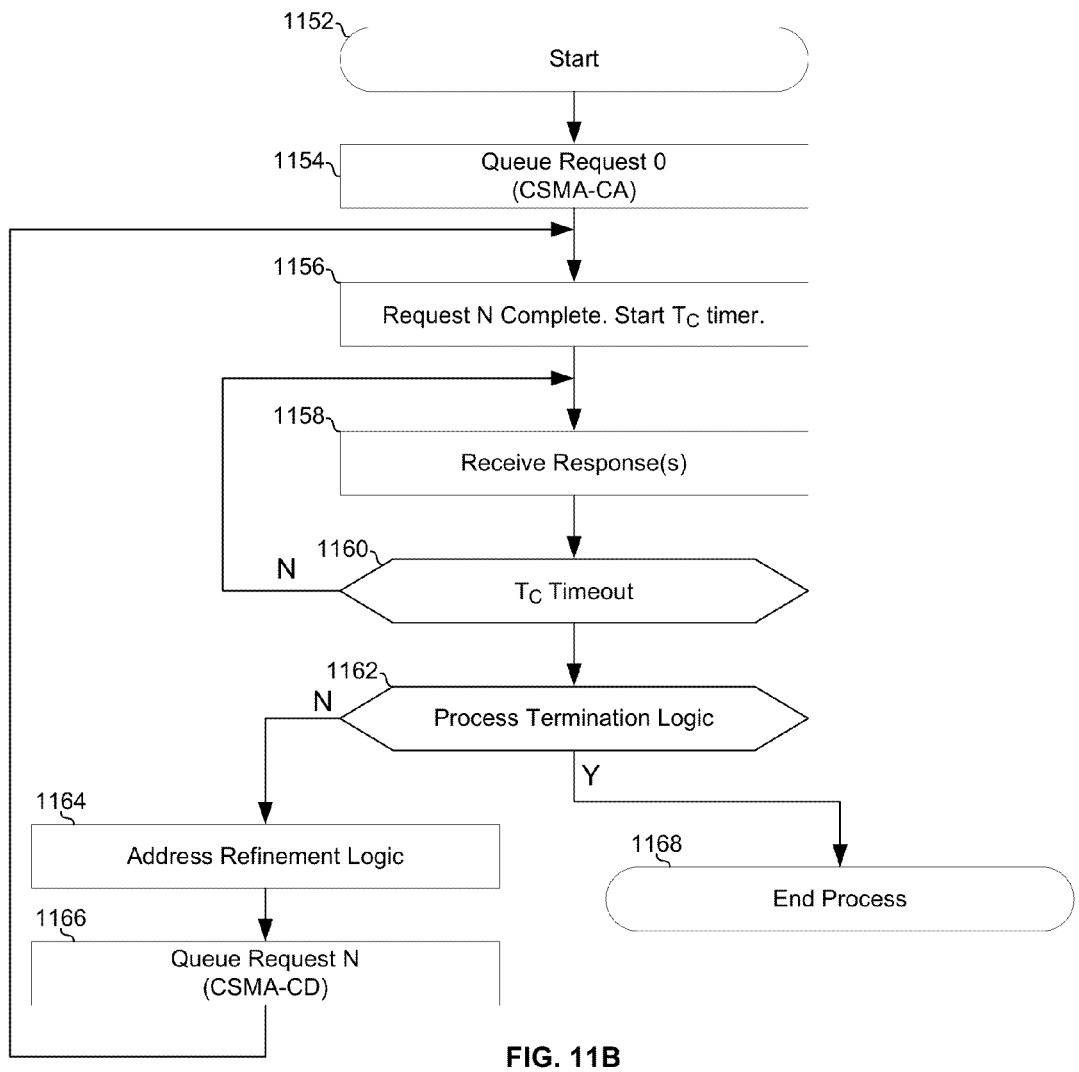
FIG. 11B illustrates exemplary steps performed by a requester in a two-party arbitrated process.
Figure 11C:
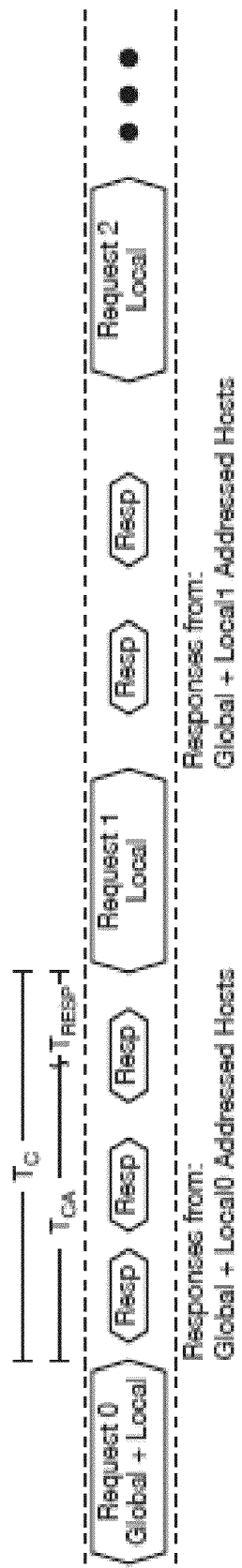
FIG. 11C depicts an example of an arbitrated two-party dialogue, using a single response channel.

FIGS. 11A-11C illustrate exemplary steps for an arbitrated two-party dialogue. Table 1 below depicts exemplary parameters utilized in the two-party dialogue process.

TABLE 1

Arbitrated Two-Party Dialogue Parameters

| Transport Parameter | Description | Data Link Layer |
|---|---|---|
| Addressing | Responders are hosts that have successfully resolved the requester's addressing parameter | N/A |
| Response Completion Timeout | Responses must complete by this point, following completion of the request. $T_{CA}$ is derived from $T_C$ by each responder: $T_{CA} \leq T_C - T_{RESP}$ (Response Duration) | $T_C$ |
| Response Channel List | Physical Layer Channel ID(s) for the responses | Channel Queue |
| Response Guard Time | CSMA Process Guard Time (Default) | $T_{GD}$ |

FIG. 11A illustrates exemplary steps 1102-1118 performed by a responder (e.g., an endpoint 104) in an arbitrated two-party dialogue. FIG. 11B illustrates exemplary steps 1150-1168 performed by a requester (e.g., an base station 102) in an arbitrated two-party dialogue. FIG. 11C depicts an example of an arbitrated two-party dialogue, using a single response channel. The request provides the $T_C$ parameter, and responders independently derive $T_{CA}$, $T_{RESP}$. FIGS. 11A-11C refer to global and local addressing. The first request of the two-party dialogue contains global addressing. In an exemplary embodiment of the invention, hosts (e.g., one or more of endpoints $104_1$-$104_{20}$) addressed via global addressing shall enter the arbitrated process, and they shall continue the process until it is terminated. In an exemplary embodiment of the invention, all requests in the series may contain local addressing. In an exemplary embodiment of the invention, hosts (e.g., one or more of endpoints $104_1$-$104_{20}$) from the pool of global addressees may enter the response window that follows each request if they pass the local addressing requirements.

In an exemplary embodiment of the invention, a first communication device (e.g., device $104_X$) comprising memory (e.g., memory 216) in which data is stored (e.g., as shown in FIGS. 4A and 4B) may receive a request packet (e.g., packet 230) from a second communication device (e.g., device 102), measure received signal strength for the request packet, and determine whether to perform the requested search of the data stored in the memory based on the received signal strength and the power at which the request packet was transmitted. The search request packet may comprise a request to search the data stored in the memory, and a transmit power field (e.g., field 304) that indicates a power at which the request packet was transmitted. The determining may be based on a result of a comparison between the received signal strength and a threshold. The determining may be based on a comparison of a relative power and a threshold. The relative power may be calculated utilizing the received signal strength and the power at which the packet was transmitted. The relative power may be calculated by subtracting the received signal strength from the power at which the packet was transmitted.

The first communication device may generate and transmit a response packet (e.g., packet 232) in response to the request packet. The response packet may comprise a transmit power field (e.g., field 324) that indicates a power at which the response packet is transmitted. The response packet may comprise a return data field (e.g., field 336). The contents and/or format of the return data field may be determined by a search specification field (e.g., field 306) of the request packet. The first communication device may perform the search by comparing a search token to the data stored in the memory. The first communication device may generate a search score that indicates the number of matches and/or partial matches of the search token found in the data stored in the memory. The first communication device may perform the search by comparing a search token to the data stored in the memory. The first communication device may generate a search score that indicates the location of matches and/or partial matches of the search token found in the data stored in the memory.

The first communication device may determine when to transmit a particular response packet based on a search score corresponding to that response packet. The first communication device may determine a channel on which to transmit a particular response packet based on a search score corresponding to that response packet. The data stored in the memory may be organized into one or more strings of characters, and a weighting factor (e.g., weighting factor 424) may be appended to each of the characters. The weighting factor for a particular character may be determined based on the position of the particular character in the one or more strings.

In an embodiment of the invention, a first communication device (e.g., device 104) may transmit a first search request packet (e.g., packet 230) comprising a transmit power field (e.g., field 304), wherein the transmit power field indicates a power at which the search request packet is transmitted. The first communication device may receive a plurality of search response packets from a plurality of second communication devices. The first communication device may transmit a second search request packet comprising a batch acknowledgment field (e.g., field 330), wherein the batch acknowledgment field acknowledges receipt of the plurality of search response packets from the plurality of second communication devices. The first communication device may generate a graphical user interface via which a user of the first communication device can manually adjust the power at which the search request packet is transmitted. The first search request packet may comprise a search specification field for instructing a data-bearing device on how to format a search response packet, on when to send a search response packet, and on what channel to transmit a search response packet.

The search request packet may communicate a minimum received power threshold. The minimum received power threshold may communicate to any data-bearing device receiving the search request packet that, if it receives the search request packet at a signal strength below the minimum power threshold, it should not respond to the search request packet. The first search request packet may comprise a search parameters field (e.g., field 308) that contains a string identifier and a search token. The first communication device may encode characters of a search token such that a hamming distance between the encoding of any two characters is proportional to the physical distance between the corresponding two keys of a keypad of the first communication device.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for adaptive searching of distributed datasets.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   in a first communication device comprising memory in which data is stored:
      receiving a request packet from a second communication device, wherein said request packet comprises:
         a request to search for a string in said data stored in said memory; and
         a transmit power field that indicates a power at which said request packet was transmitted;
      measuring a received signal strength for said request packet; and
      determining whether to perform said search for said string in said data stored in said memory based on said received signal strength and said power at which said request packet was transmitted.

2. The method of claim 1, wherein said determining is based on a result of a comparison between said received signal strength and a threshold.

3. The method of claim 1, wherein:
   said determining is based on a comparison of a relative power and a threshold; and
   said relative power is calculated utilizing said received signal strength and said power at which said packet was transmitted.

4. The method of claim 3, wherein said relative power is calculated by subtracting said received signal strength from said power at which said packet was transmitted.

5. The method of claim 1, the method comprising:
   in said first communication device:
      generating a response packet in response to said request packet wherein said response packet comprises a transmit power field that indicates a power at which said response packet is transmitted; and
      transmitting said response packet.

6. The method of claim 5, wherein:
   said response packet comprises a return data field; and
   the contents and/or format of said return data field is determined by a search specification field of said request packet.

7. The method of claim 1, the method comprising:
   in said first communication device:
      performing said search by comparing a search token to said data stored in said memory; and
      generating a search score that indicates the number of matches and/or partial matches of said search token found in said data stored in said memory.

8. The method of claim 1, the method comprising:
   in said first communication device:
      performing said search by comparing a search token to said data stored in said memory; and
      generating a search score that indicates the location of matches and/or partial matches of said search token found in said data stored in said memory.

9. The method of claim 1, the method comprising:
   in said first communication device:
      determining when to transmit a particular response packet based on a search score corresponding to that response packet.

10. The method of claim 1, the method comprising:
    in said first communication device:
       determining a channel on which to transmit a particular response packet based on a search score corresponding to that response packet.

11. The method of claim 1, wherein:
    said string in said data comprises one or more characters; and
    a weighting factor for a particular character of said one or more characters is determined based on position of said particular character in said string.

12. A method comprising:
    in a first communication device:
       transmitting a first search request packet comprising a transmit power field, wherein said transmit power field indicates a power at which said search request packet is transmitted;
       receiving a plurality of search response packets from a plurality of second communication devices;
       transmitting a second search request packet comprising a batch acknowledgment field, wherein said batch acknowledgment field acknowledges receipt of said plurality of search response packets from said plurality of second communication devices.

13. The method of claim 12, the method comprising:
    generating a graphical user interface via which a user of the first communication device can manually adjust said power at which said search request packet is transmitted.

14. The method of claim 12, wherein said first search request packet comprises a search specification field for instructing a data-bearing device on when to send a search response packet.

15. The method of claim 12, wherein said first search request packet comprises a search specification field for instructing a data-bearing device on what channel to transmit a search response packet.

16. The method of claim 12, wherein:
    said search request packet communicates a minimum received power threshold; and
    said minimum received power threshold communicates that, if the search request packet is received at a signal strength below the minimum power threshold, the search should not be responded to.

17. A system comprising:

One or more circuits comprising a memory in which data is stored, wherein said one or more circuits are operable to:
receive a request packet comprising:
a request to search for a string in said data stored in said memory, and
a transmit power field that indicates a power at which said request packet was transmitted;
measure a received signal strength for said request packet; and
determine whether to perform said search of said string in said data stored in said memory based on said received signal strength and said power at which said request packet was transmitted.

* * * * *